(12) United States Patent
Higgins et al.

(10) Patent No.: US 12,412,211 B2
(45) Date of Patent: Sep. 9, 2025

(54) MITIGATING LINE OF CREDIT RISKS OF A GAMING ESTABLISHMENT CREDIT SYSTEM

(71) Applicant: IGT, Las Vegas, NV (US)

(72) Inventors: Kevin Higgins, Reno, NV (US); Jeffery Shepherd, Reno, NV (US)

(73) Assignee: IGT, Las Vegas, NV (US)

( * ) Notice: Subject to any disclaimer, the term of this patent is extended or adjusted under 35 U.S.C. 154(b) by 14 days.

(21) Appl. No.: 18/521,481

(22) Filed: Nov. 28, 2023

(65) Prior Publication Data
US 2024/0104649 A1    Mar. 28, 2024

Related U.S. Application Data

(63) Continuation of application No. 17/118,118, filed on Dec. 10, 2020, now abandoned.

(51) Int. Cl.
*G06Q 40/03*    (2023.01)
*G07F 17/32*    (2006.01)

(52) U.S. Cl.
CPC ......... *G06Q 40/03* (2023.01); *G07F 17/3237* (2013.01); *G07F 17/3244* (2013.01)

(58) Field of Classification Search
CPC .. G06Q 40/03; G07F 17/3237; G07F 17/3244
USPC .................................................. 705/35–45
See application file for complete search history.

(56) References Cited

U.S. PATENT DOCUMENTS

| | | | |
|---|---|---|---|
| 5,902,983 A * | 5/1999 | Crevelt | G07F 17/32 463/20 |
| 6,088,686 A | 7/2000 | Walker et al. | |
| 7,461,780 B2 * | 12/2008 | Potts | G06Q 20/042 235/380 |
| 7,472,090 B1 | 12/2008 | White | |
| 7,676,425 B1 | 3/2010 | Noles | |
| 7,885,890 B2 | 2/2011 | Haertel | |
| 8,300,917 B2 | 10/2012 | Borgia et al. | |
| 8,775,301 B2 | 7/2014 | Haggerty et al. | |
| 8,784,188 B2 | 7/2014 | Walker et al. | |
| 10,546,463 B2 | 1/2020 | Higgins et al. | |
| 10,573,128 B2 | 2/2020 | Sanford et al. | |
| 2003/0092483 A1 * | 5/2003 | Bennett | G07F 17/32 463/25 |
| 2007/0124238 A1 | 5/2007 | Hogg et al. | |
| 2008/0132308 A1 * | 6/2008 | Muir | G07F 17/3239 463/16 |
| 2008/0139303 A1 | 6/2008 | Patterson | |
| 2008/0177655 A1 | 7/2008 | Zalik | |
| 2008/0294547 A1 | 11/2008 | Zigman | |
| 2009/0144152 A1 | 6/2009 | Wilson | |

(Continued)

*Primary Examiner* — Robert R Niquette
(74) *Attorney, Agent, or Firm* — Neal, Gerber & Eisenberg LLP

(57) ABSTRACT

A system that coordinates the issuance of a line of credit or marker for a user based on financial information associated with that user. Following a user, such as a player, applying for a line of credit with a gaming establishment credit system and following the user authorizing access to a financial institution account maintained for the user by a financial institution, the system operates with the financial institution to obtain financial information associated with the financial account. The system utilizes the obtained financial information to determine one or more attributes of the applied for line of credit.

20 Claims, 7 Drawing Sheets

(56) References Cited

U.S. PATENT DOCUMENTS

| | | |
|---|---|---|
| 2009/0318220 A1 | 12/2009 | Arezina et al. |
| 2011/0077073 A1 | 3/2011 | Gagner et al. |
| 2016/0292965 A1* | 10/2016 | Sanford .............. G07F 17/3234 |
| 2018/0040199 A1 | 2/2018 | Ellis |
| 2019/0347722 A1* | 11/2019 | Potts .................... G06Q 20/108 |
| 2020/0219187 A1 | 7/2020 | Zarrad |
| 2021/0110358 A1* | 4/2021 | Nguyen ................ G06F 3/1207 |
| 2021/0150857 A1* | 5/2021 | Miri .................... G07F 17/3241 |
| 2021/0272191 A1 | 9/2021 | Fontana et al. |
| 2024/0104649 A1* | 3/2024 | Higgins .............. G07F 17/3237 |

\* cited by examiner

MITIGATING LINE OF CREDIT RISKS OF A GAMING ESTABLISHMENT CREDIT SYSTEM

This application is a continuation of, claims priority to and the benefit of U.S. patent application Ser. No. 17/118,118, filed on Dec. 10, 2020, the entire contents of which is incorporated by reference herein.

BACKGROUND

In various embodiments, the systems and methods of the present disclosure employ user authorized third party data to mitigate the risks involved with offering lines of credit to gaming establishment patrons.

Electronic gaming machines and gaming tables may enable a player to play a game wherein the player may be required to place a wager.

BRIEF SUMMARY

In certain embodiments, the present disclosure relates to a system including a processor, and a memory device that stores a plurality of instructions. When executed by the processor responsive to a request to establish a gaming establishment line of credit associated with a first amount of funds, the instructions cause the processor to receive financial information associated with a financial account of a user maintained by a financial institution independent of the processor and determine, based on the received financial information, a parameter of the gaming establishment line of credit. When executed by the processor responsive to a determination of a first parameter of the gaming establishment line of credit, the instructions cause the processor to enable an activation of the first amount of funds in association with the gaming establishment line of credit.

In certain embodiments, the present disclosure relates to a system including a processor, and a memory device that stores a plurality of instructions. When executed by the processor responsive to a request to establish a gaming establishment line of credit associated with a first amount of funds, the instructions cause the processor to receive financial information associated with a financial account of a user maintained by a financial institution independent of the processor, and determine, based on the received financial information, a parameter of the gaming establishment line of credit. When executed by the processor responsive to a determination of a first parameter of the gaming establishment line of credit and prior to any scheduling of any transfer of the first amount of funds from the financial account of the user to any gaming establishment account of the user, the instructions cause the processor to not establish the gaming establishment line of credit. When executed by the processor responsive to the determination of the first parameter of the gaming establishment line of credit and following a scheduling of a transfer of the first amount of funds from the financial account of the user to a gaming establishment account of the user, the instructions cause the processor to enable an activation of the first amount of funds in association with the gaming establishment line of credit.

In certain embodiments, the present disclosure relates to a method of operating a system, wherein responsive to a request to establish a gaming establishment line of credit associated with a first amount of funds, the method includes receiving financial information associated with a financial account of a user maintained by a financial institution independent of the processor, and determining, by a processor and based on the received financial information, a parameter of the gaming establishment line of credit. Responsive to a determination of a first parameter of the gaming establishment line of credit, the method includes enabling an activation of the first amount of funds in association with the gaming establishment line of credit.

Additional features are described herein, and will be apparent from the following Detailed Description and the figures.

DETAILED DESCRIPTION

Figure 1:
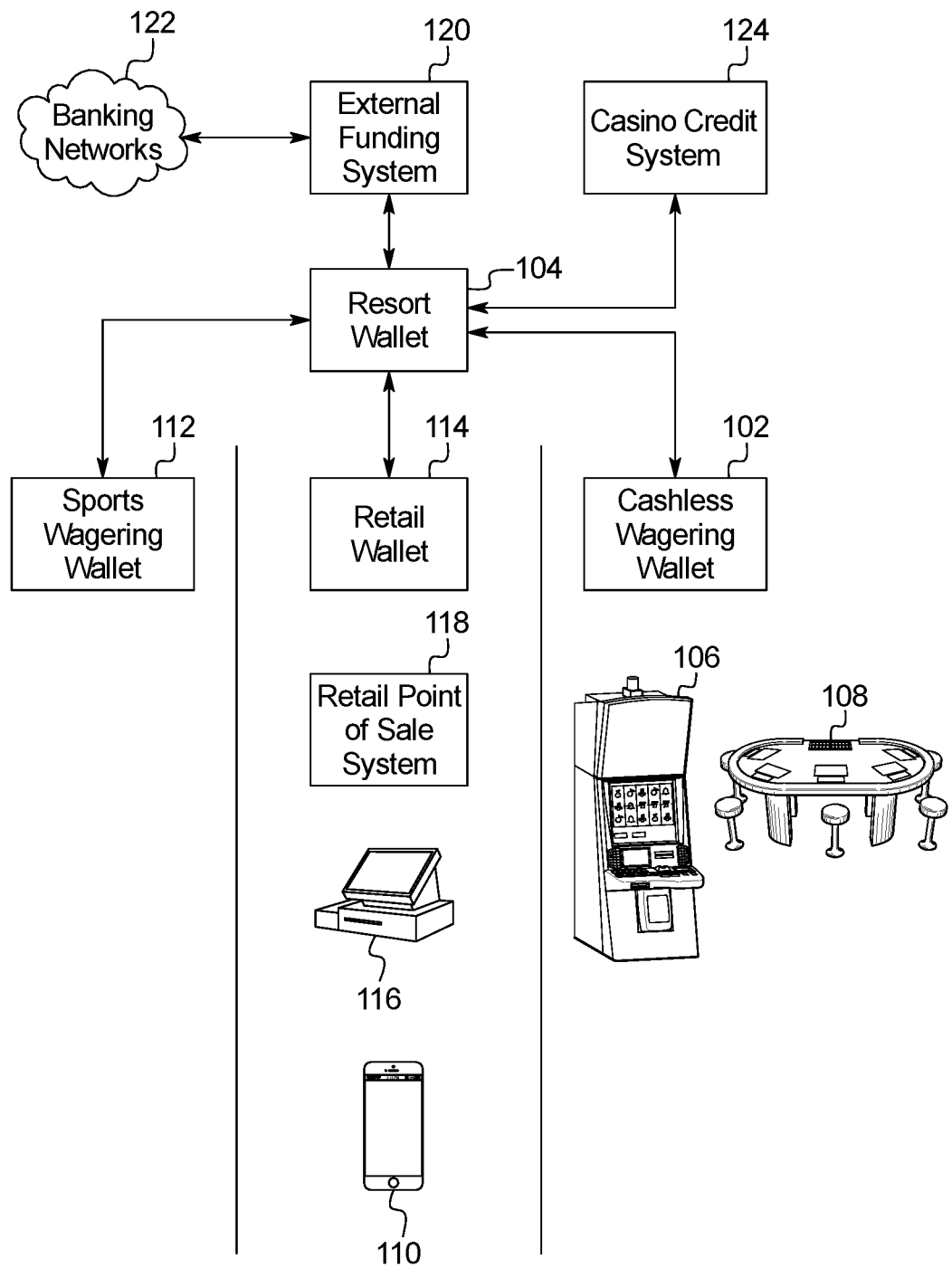
FIG. 1 is an example configuration of the architecture of a plurality of different components of the system of the present disclosure.

In various embodiments, the system of the present disclosure mitigates the risks involved with offering lines of credit to gaming establishment patrons.

In certain embodiments, the system utilizes one or more interfaces, such as a mobile device application being executed by a mobile device and/or a remote host controlled service window displayed by a gaming device, to coordinate the issuance of a line of credit or marker for a user based on financial information associated with that user. In these embodiments, following a user, such as a player, applying for a line of credit with a gaming establishment credit system and following the user authorizing access to a financial institution account maintained for the user by a financial institution, the system operates with the financial institution to obtain financial information associated with the financial account. Such financial information includes, but is not limited to, account balances, account credits, account debits, historical transactions and/or designated high risk transactions (e.g., late payment charges, overdraft charges). The system then utilizes the obtained financial information to determine one or more attributes of the applied for line of credit, such as determining whether to approve the applied for line of credit and/or determining an amount of credit to offer the user. Accordingly, rather than offering a line of credit to a user unaware of the user's financial situation outside the gaming establishment, the system of the present disclosure utilizes various financial information associated with the user (and obtained from a third-party) to enable a relatively more informed decision in offering lines of credit to users. That is, providing gaming establishment credit systems information about one or more financial accounts, such as bank accounts, a user has and the current balances of such accounts aids the gaming establishment credit system in offering the user an unsecured line of credit (i.e., a line of credit not backed by any pending transaction or collateral), thereby reducing the likelihood that such unsecured debt is extended to an otherwise unqualified user. Such a configuration thus reduces occurrences of fraud perpetrated on a gaming establishment (e.g., when an individual commits a felony by providing a check to a gaming establishment guaranteeing the amount of the line of credit despite the checking account not having adequate funds to cover the check) by enabling the gaming establishment to confirm, prior to approving the line of credit, that one or more accounts of the individual has adequate funds to cover the amount borrowed under the line of credit.

It should be appreciated that obtaining financial information directly from a user's financial institution and analyzing the obtained financial information to determine one or more parameters of any lines of credit overcomes certain recognized problems with prior line of credit systems. For example, while certain gaming establishments attempted to reduce the risk of loss of fraud by performing a credit check on a player and then leveraging that information to determine how much unsecured credit to offer the player, such credit checks are problematic both for the gaming establishment (e.g., if many players request lines of credit for relatively small or medium amounts, the costs to perform such credit checks can be prohibitive) and for the player (e.g., if a player has triggered too many credit checks in a relatively short timeframe, the accumulation of credit checks can damage the player's credit, thereby discouraging players from visiting the gaming establishment). Accordingly, the elimination of performing credit checks on players prior to issuing any lines of credit not only benefits the gaming establishment and player via elimination of these recognized problems, but also results in a more secure system by reducing the amount of data communicated to third party credit reporting agencies, thereby minimizing the chances that such data becomes compromised in any way.

Moreover, to account for gaming establishment patrons being uncomfortable venturing into a gaming establishment with large amounts of cash as well as many gaming establishment patrons being relatively cash poor (e.g., patrons may have a relatively high net worth but most of their net worth may be tied up in various illiquid investments or assets which they are reluctant to sell to raise cash for gambling), the system employs one or more credit components of the system, such as a gaming establishment credit system, to issue one or more lines of credit or markers (to draw from in association with one or more of the accounts maintained by one or more of the system components). Such a utilization of one or more lines of credit or markers paired with an analysis of assets maintained by a third party provides such relatively cash poor gaming establishment patrons with the availability of an amount of funds without exposing the gaming establishment credit system to substantially increased risks of making such funds available.

In certain embodiments, in addition to utilizing financial information associated with a financial account maintained for a user to determine one or more attributes of an applied for line of credit, the system secures the applied for line of credit with a scheduled transfer of funds from one or more financial accounts maintained for the user. In these embodiments, following a user employing a mobile device application (or other suitable interface) to authorize a scheduled transfer of funds from a financial institution to cover the applied for line of credit, the gaming establishment credit system issues the user a line of credit or marker associated with the amount of funds of the authorized scheduled transfer. Such a line of credit is backed by the transfer (scheduled to occur when the line of credit becomes due) and thus represents a relatively more secure transaction by the gaming establishment than other unsecured lines of credit. That is, by first obtaining financial information from a financial account maintained for a user and then requiring that an applied for line of credit be paired with a scheduled transfer of an amount of funds from this financial account, the system of the present disclosure reduces instances of unpaid for lines of credit by not only making informed decisions regarding amounts of funds in one or more financial accounts maintained for a user prior to extending any credit to that user, but also by securing the amount of funds with a scheduled transfer to pay off part or all of an activated line of credit.

It should be appreciated that in addition to minimizing certain risks associated with issuing players lines of credit, the utilization of one or more lines of credit or markers expedites the availability of an amount of funds without imposing higher fees associated with certain types of fund transfers. Put differently, rather than forcing a user to decide whether they want funds transferred from a third party account relatively quickly (while paying a relatively high fee) or relatively slowly (while avoiding such a relatively high fee), using a line of credit associated with a scheduled, but not yet completed, transfer of funds as front money for user's transactions at a gaming establishment eliminates or drastically lowers the fund transfer fees while also making those funds immediately available to a user by integrating one or more credit systems to issue the user a line of credit or marker with the security of a scheduled transfer from a financial institution account having a verified amount of funds available. Additionally, such a configuration of employing financial information associated with a user in enabling the user to access funds from a line of credit from an interface remote from presenting a physical check to gaming establishment personnel reduces the use of paper ticket vouchers (which a gaming establishment cage may issue against a line of credit for use at an electronic gaming machine ("EGM") and/or a gaming table following the presentation of a physical check) thereby reducing the amount of waste produced by gaming establishments.

System Accounts

In various embodiments, the present disclosure is directed to a gaming establishment fund management system including various components or sub-systems that are each associated with or otherwise maintain one or more electronic or virtual accounts. In these embodiments, the various accounts maintained for a user collectively form a resort or enterprise account (i.e., a gaming establishment fund management account) for the user. That is, the collection of cashless wagering accounts (e.g. cashless gaming establishment wagering wallets, cashless sports wagering wallets and/or cashless mobile wagering wallets) and gaming establishment retail accounts (e.g., gaming establishment retail wallets) associated with or otherwise maintained for a user, such as a player and/or retail patron, collectively form a resort or enterprise account (i.e., an integrated resort or gaming establishment fund management wallet) that the user may access to transfer funds and/or view balance information amongst the various accounts associated with or otherwise maintained for the user.

In various embodiments, the gaming establishment fund management system includes or is otherwise associated with one or more cashless wagering systems. Each cashless wagering system is associated with or otherwise maintain one or more cashless wagering accounts. In certain embodiments, the gaming establishment fund management system includes a first cashless wagering system that maintains a first cashless wagering account. In these embodiments, a user, such as a player of an EGM, utilizes a mobile device application running on a mobile device and/or a physical instrument (e.g., a smart card or a user issued magnetic striped card which the user utilizes via inserting the card into a player tracking unit associated with the EGM) to facilitate the electronic transfer of any funds between this first cashless wagering account and a gaming device, such as a component of a gaming table and/or an EGM (including, but not limited to, a slot machine, a video poker machine, a video lottery terminal, a terminal associated with an electronic table game, a terminal associated with a live table game, a video keno machine, a video bingo, and/or a sports betting terminal (that offers wagering games and/or sports betting opportunities)). For example, as seen in FIG. 1, the gaming establishment fund management system includes a first cashless wagering system (not shown) that maintains a cashless wagering wallet 102 (e.g., a first cashless wagering account) which is in communication with the resort wallet 104. In this example, to facilitate the transfer of funds from this cashless wagering account to a credit balance of an EGM 106 and/or a credit balance of a gaming table component (not shown) associated with a gaming table 108, the system utilizes a mobile device 110 running a mobile device application that interfaces with one or more components of the gaming establishment fund management system to enable a user, such as a player of the EGM or a player at the gaming table, access to this first cashless wagering account.

In certain embodiments, the gaming establishment fund management system additionally or alternatively includes or is otherwise associated with a second cashless wagering system that maintains a second cashless wagering account. In these embodiments, funds associated with the second cashless wagering account are utilized to place one or more sporting event wagers and/or wagers placed remote from an EGM and a gaming table. In such embodiments, a user utilizes a mobile device application running on a mobile device and/or a physical instrument (e.g., a smart card or a user issued magnetic striped card which the user utilizes via inserting the card into a kiosk) to facilitate the electronic transfer of any funds between this second cashless wagering account and a credit balance accessible to wager on sporting events and/or games of chance (or games of skill) remote from an EGM and a gaming table. For example, as seen in FIG. 1, the gaming establishment fund management system includes a second cashless wagering system (not shown) that maintains a sports wagering wallet 112 (e.g., a second cashless wagering account) which is in communication with the resort wallet 104. In this example, to facilitate the transfer of funds from this cashless wagering account to a credit balance associated with a sporting event wagering system (not shown) and/or a remote wagering system (not shown) to enable the placement of one or more wagers on one or more sporting events and/or one or more games of chance (or games of skill), the system utilizes a mobile device 110 running a mobile device application that interfaces with one or more components of the gaming establishment fund management system to enable a user, such as a user remote from the gaming establishment, access to this second cashless wagering account.

In various embodiments, in addition to or an alternative of maintaining one or more cashless wagering accounts via one or more cashless wagering systems, the gaming establishment fund management system includes or is otherwise associated with one or more gaming establishment retail wallet systems that each maintain one or more gaming establishment retail accounts. Such a gaming establishment retail account (e.g., a gaming establishment retail wallet) of a gaming establishment retail wallet system integrates with various retail point-of-sale systems throughout the gaming establishment (or located remote from the gaming establishment, but otherwise associated with the gaming establishment) to enable users to purchase goods and/or services via the user's gaming establishment retail account. For example, as seen in FIG. 1, the gaming establishment fund management system includes a gaming establishment retail wallet system (not shown) that maintains a retail wallet 114 (e.g., a gaming establishment retail account) which is in communication with the resort wallet 104. In this example, to facilitate the transfer of funds from this gaming establishment retail account to an account associated with a retailer to purchase goods and/or services from the retailer, the system utilizes a retail wallet identity, such as a mobile device 110 running a mobile device application that interfaces with a point-of-sale terminal 116 of a retail point-of-sale system 118 of the retailer, and one or more components of the gaming establishment fund management system to enable a user access to this gaming establishment retail account. In other embodiments, the gaming establishment fund management system does not maintain a separate gaming establishment retail account, but rather utilizes the gaming establishment retail wallet system as a transaction coordinator to account for any transactions to purchase goods and/or services from a retailer.

It should be appreciated that in various embodiments, a gaming establishment retail account is a retail account associated with a user having a balance or a pre-paid access account which, per current regulations from the U.S. Treasury Department Financial Crimes Enforcement Network ("FinCEN"), cannot be convertible to cash and can only be used for the purchase of goods and/or services. In these embodiments, such a gaming establishment retail account integrates with various retail point-of-sale systems of various retail establishments throughout or otherwise associated with a gaming establishment to enable users to purchase goods and/or services via the user's gaming establishment retail account. Accordingly, in certain embodiments, based on one or more jurisdictional regulations, an amount of funds deposited in a gaming establishment retail account may be used with various retail point-of-sale systems throughout the gaming establishment (or remote from, but otherwise associated with the gaming establishment) to enable users to purchase goods and/or services, but such funds deposited in the gaming establishment retail account cannot be converted to cash or check. In certain other embodiments, based on one or more different jurisdictional regulations, an amount of funds deposited in a gaming establishment retail account, such as an account associated with an identified user, may be used with various retail point-of-sale systems throughout the gaming establishment (or remote from, but otherwise associated with the gaming establishment) to enable users to purchase goods and/or services wherein such funds deposited in the gaming establishment retail account may be converted to or otherwise redeemable for cash or check.

In certain embodiments, the gaming establishment fund management system is in communication with one or more external funding sources which maintain one or more external accounts for the user. For example, as seen in FIG. 1, the gaming establishment fund management system that maintains the resort wallet 104 is in communication with an external funding system 120 which is in communication with a network of one or more banks or other financial institutions (i.e., the banking networks 122) which operate to electronically transfer funds from the user's accounts maintained at such banks or financial institutions to one or more of the accounts maintained by the gaming establishment fund management system and/or provide financial information associated with the user's accounts maintained at such banks or financial institutions. In certain embodiments, such external accounts include, but are not limited to, one or more checking accounts maintained by one or more financial institutions (e.g., one or more banks and/or credit unions), one or more savings accounts maintained by one or more financial institutions, one or more financial institution accounts, such as a brokerage account, maintained by one or more financial institutions, one or more credit card accounts maintained by one or more financial institutions, one or more debit card accounts maintained by one or more financial institutions, and/or one or more third-party maintained accounts (e.g., one or more PayPal® accounts or Venmo® accounts). It should be appreciated that while illustrated as the gaming establishment fund management system being in communication with one or more external funding sources, in different embodiments, any component or sub-system of the present disclosure can be in communication with one or more external funding sources. In different embodiments, the system utilizes a mobile device running a mobile device application, a kiosk, a gaming device, a remote host controlled service window displayed by a gaming device, a component of a gaming establishment patron management system, such as a player tracking unit, and/or a gaming establishment interface to facilitate the transfer of funds from an external account and/or facilitate the transfer of financial information associated with such external accounts.

In certain embodiments, the gaming establishment fund management system is in communication with one or more credit systems which each issue the user one or more lines of credit or markers. For example, as seen in FIG. 1, the gaming establishment fund management system that maintains the resort wallet 104 is in communication with a gaming establishment credit system (i.e., the casino credit system 124) to facilitate the establishment of an amount of funds in the gaming establishment fund management account via one or more lines of credits. In this example and as described below, to facilitate a transfer of funds from the line of credit issued by the credit system to a cashless wagering account (and then to a credit balance of an EGM 106 and/or a credit balance of a gaming table component (not shown) associated with a gaming table 108), the system utilizes a mobile device 110 running a mobile device application that interfaces with one or more components of the credit system to enable a user, such as a player of the EGM or a player at the gaming table, to apply for a line of credit, grant permission to review financial information associated with the user and/or access an amount of funds associated with an issued line of credit. It should be appreciated that while illustrated as the gaming establishment fund management system being in communication with one or more credit systems, in different embodiments, any component or sub-system of the present disclosure can be in communication with one or more credit systems.

In certain embodiments wherein the gaming establishment fund management system is in communication with one or more credit systems which each issue the user one or more lines of credit or markers, the gaming establishment fund management system (and/or the gaming establishment credit system) maintains an outstanding line of credit balance or account which tracks the amount of funds owed to the gaming establishment credit system. In these embodiments, the gaming establishment fund management system maintains this outstanding line of credit balance or account to enable greater user flexibility in how they use the activated funds from a line of credit (when compared to a system that automatically pays back part or all of the funds from an activated line of credit with each cash out from each EGM). In such embodiments, since the activated line of credit need not be repaid with each cash out from each EGM (and thus remains outstanding until paid back upon an occurrence of a line of credit repayment event, such as when a scheduled transfer of funds from an external account is completed), the user can transition from one EGM to another EGM (or other gaming device) with complete access to the available amount of funds of the activated line of credit. That is, since the funds from a credit balance of an EGM are transferred to a gaming establishment account, such as a cashless wagering account, upon a cash out event at the EGM, such funds remain available for immediate use at another EGM (or another gaming device) without requiring the user to reactivate any lines of credit with any gaming establishment credit systems. Such a configuration provides a user greater control over the funds owed to the gaming establishment credit system under the activated line of credit.

In certain embodiments (not shown), the gaming establishment fund management system is also in communication with one or more credit reporting/credit risk systems which monitor and report on various accounts associated with the user. For example, the gaming establishment fund management system that maintains the resort wallet is in communication with one or more credit reporting and risk systems. These credit reporting and risk systems monitor and report on a credit rating and status of one or more accounts maintained for the user at various funding sources, such as various financial institutions. It should be appreciated that while illustrated as the gaming establishment fund management system being in communication with one or more credit reporting networks and one or more credit reporting/credit risk systems, in different embodiments, any component or sub-system of the present disclosure can be in communication with one or more credit reporting/credit risk systems.

In certain embodiments, the system utilizes one mobile device application to interact with the different components of the gaming establishment fund management system to access funds maintained in the different gaming establishment accounts associated with the user, apply for one or more lines of credit and/or to access funds associated with one or more lines of credit or markers issued to the user. For example, utilizing the same mobile application, a mobile device interacts with both the first cashless wagering system of the gaming establishment fund management system and the credit system in communication with the gaming establishment fund management system. In certain embodiments, the system utilizes multiple mobile device applications to interact with the different components of the gaming establishment fund management system to access funds maintained in the different gaming establishment accounts associated with the user, apply for one or more lines of credit and/or to access funds associated with one or more lines of credit or markers issued to the user. In certain of these embodiments, the mobile device applications include a location based digital wallet enabled application, such as a Passbook-enabled or Wallet-enabled application, which is accessible when the user enters a gaming establishment. In certain of such embodiments, the mobile device applications are downloaded to the mobile device from an application store. In certain of such embodiments, the mobile device applications are downloaded to the mobile device from one or more websites affiliated with the gaming establishment (which are accessible directly by the user and/or by a link opened when the user scans a QR code).

It should be appreciated that in different embodiments, in addition to or alternatively from utilizing a mobile device running a mobile device application to access funds associated with different gaming establishment accounts, apply for one or more lines of credit and/or to access funds associated with one or more lines of credit issued to the user, the system utilizes a kiosk, an EGM, a remote host controlled service window displayed by an EGM, a display device/input device associated with a seat-level gaming table component, a display device/input device associated with a table-level gaming table component, a display device/input device associated with a mobile gaming table component, a component of a gaming establishment patron management system, such as a player tracking unit, and/or a gaming establishment interface, such as a casino desk, to access the funds associated with such gaming establishment accounts, apply for one or more lines of credit and/or to access funds associated with one or more lines of credit issued to the user. It should be further appreciated that while illustrated in FIG. 1 as using a mobile device running a mobile device application to access funds associated with different gaming establishment accounts (e.g., a cashless wagering account and a gaming establishment retail account), apply for one or more lines of credit and/or to access funds associated with one or more lines of credit issued to the user, a physical instrument, such as a smart card or a user issued magnetic striped card may additionally or alternatively be utilized to enable a user access to such gaming establishment accounts, apply for one or more lines of credit and/or to access funds associated with one or more lines of credit issued to the user.

Issuing A Line of Credit

In various embodiments, prior to activating any funds associated with an issued line of credit, a user, such as a player, must first open a line of credit or marker with the gaming establishment credit system. In these embodiments, utilizing an interface, such as a mobile device application being executed by a mobile device, a mobile website accessed from a browser of a mobile device and/or a remote host controlled service window displayed by EGM (or other gaming device), the user applies for a line of credit through one or more interactive forms. For example, as part of applying for a line of credit with a gaming establishment credit system, a user (whom has already logged into one or more gaming establishment fund management system accounts via a mobile device application) makes one or more inputs via the mobile device application to provide certain information, such as, but not limited to, additional address details, a social security number and/or a mother's maiden name.

Figure 2A:
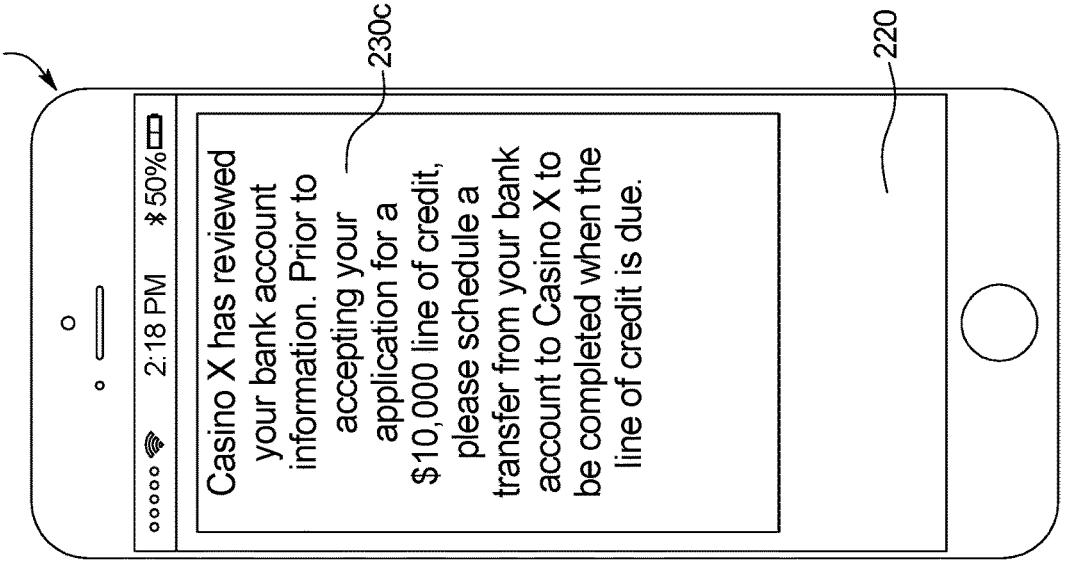
FIGS. 2A, 2B, and 2C are example graphical user interfaces displayed in connection with a mobile device application and pertaining to a player opening a line of credit based on banking information associated with that user.

Following the providing of such information, the system prompts the user to associate one or more gaming establishment fund management system accounts maintained for that user with one or more external accounts maintained for that user by a third party, such as one or more financial institution accounts maintained by one or more financial institutions for the user. In addition to associating one or more gaming establishment fund management system accounts with one or more external accounts, the system prompts the user to log into such external accounts and provide access to the gaming establishment credit system to view information associated with such external accounts. Such information includes any financial information (e.g., account names, account numbers, account balances, account credits, account debits, historical transactions and/or designated high risk transactions, such as late payment charges, and/or overdraft charges) or non-financial information that will assist the gaming establishment credit system in determining whether to approve the applied for line of credit and/or determining one or more parameters of the applied for line of credit. For example, as seen in FIG. 2A, a mobile device application 220 of a mobile device 210 displays a message 230a to a player that they have applied for a line of credit of $10,000 (or a line of credit for a gaming establishment credit system determined amount) and now need to select a bank to associate with the applied for line of credit and log into their bank account and approve the release of their bank account information.

In certain embodiments, once the user grants access to the gaming establishment credit system to retrieve information associated with one or more external accounts, one or more components of the gaming establishment fund management system, such as the external funding system and/or the gaming establishment credit system operates with one or more servers of the financial institution that maintains the external account to gather information associated with such external accounts. For example, a mobile device application of a mobile device operates with the external funding system (which communicates, via one or more banking networks, with a financial institution) to obtain information regarding deposits and withdrawals for a linked financial account maintained by the financial institution. In certain embodiments, once the user grants access to the gaming establishment credit system to retrieve information associated with one or more external accounts, the gaming establishment credit system leverages one or more application programming interfaces, such as Plaid Auth, Plaid Balance and/or Plaid Transactions, to gather information associated with one or more external accounts.

In certain embodiments, in addition to granting access to the gaming establishment credit system to retrieve information associated with one or more external accounts to aid the gaming establishment credit system in approving an applied for line of credit, the system enables the user to designate such external accounts as the source of paying off the line of credit (if the line of credit is approved) when the line of credit is due. It should be appreciated that unlike certain embodiments wherein in applying for the line of credit, the user schedules a transfer of funds from an external account to pay off the line of credit at a future point in time, these embodiments involve one or more user actions, such as one or more inputs made via the mobile device application or gaming establishment website, to trigger or otherwise schedule the paying off of the line of credit (including any fees, such as any late fees, any interest payment fees, any daily or periodic fees accrued, and/or any penalties) independent of the opening of the line of credit.

In various embodiments, following the user applying for a line of credit with a gaming establishment credit system and following the gaming establishment credit system (and/or other component of the gaming establishment fund management system) obtaining access to information from one or more financial institution accounts maintained for the user by one or more financial institutions, the system utilizes the obtained financial information to determine one or more attributes of the applied for line of credit, such as determining whether to approve the applied for line of credit and/or determining an amount of credit to offer the user. In certain embodiments, the gaming establishment credit system leverages the obtained financial information to determine the user's current assets and liabilities for the particular bank account the user linked to the gaming establishment fund management system.

If the system determines, based on inspecting the obtained financial information, that the user is ineligible to be issued a line of credit from the gaming establishment credit system, the system denies the user the use of the requested amount of funds. That is, upon a line of credit disapproval event (which occurs, based at least in part on financial information obtained from a linked financial account), the system does not enable the user to utilize the requested amount of funds of the applied for line of credit. In these embodiments, the system proceeds with communicating a denial of a line of credit message to the user, such as via a mobile device application displaying a line of credit or marker denial to the user.

Figure 2B:
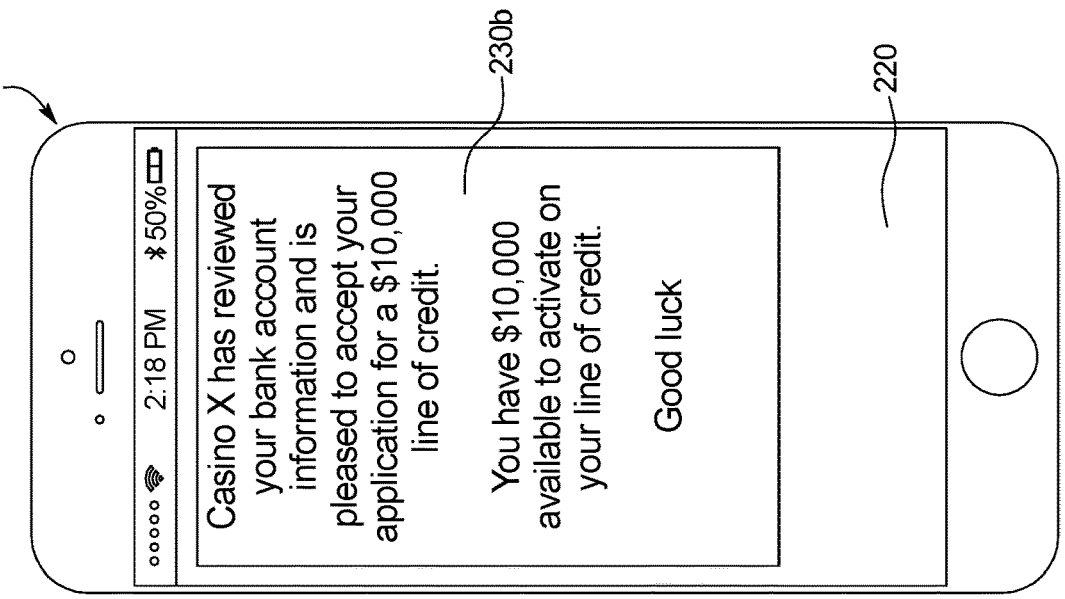

On the other hand, if the system determines, based on inspecting the obtained financial information, that the user is eligible to be issued a line of credit from the gaming establishment credit system, the system approves an amount of funds available to the user in association with the issued line of credit. That is, upon a credit approval event (which occurs, based at least in part on financial information obtained from a linked financial account), the system enables the user to utilize the requested amount of funds associated with the applied for line of credit. For example, as seen in FIG. 2B, following the gaming establishment credit system determining, based on bank account information retrieved from a player's bank, that the player's application for a $10,000 line of credit is approved, a mobile device application 220 of a mobile device 210 displays a message 230b to the player that, following the review of the released bank account information, the applied for line of credit of $10,000 application is accepted and the player now has access to up to $10,000 to activate on the approved line of credit.

Figure 3A:
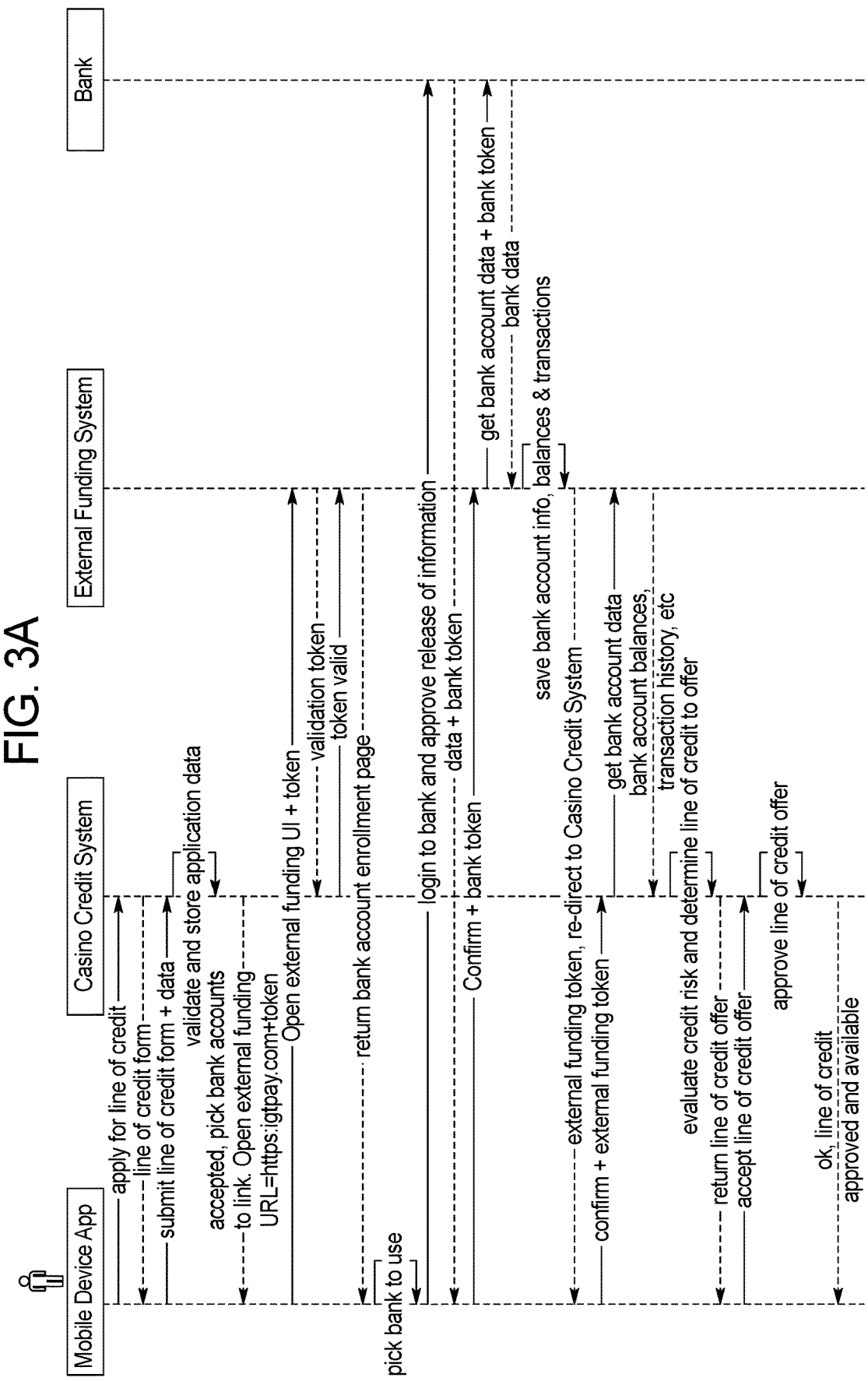
FIGS. 3A and 3B are flow charts of example processes for operating a system which opens a line of credit based on banking information obtained via an external funding system.

Accordingly, rather than offering a line of credit to a user unaware of the user's financial situation outside the gaming establishment, the system of the present disclosure utilizes various financial information associated with the user (and obtained from a third-party) to enable a relatively more informed decision in offering lines of credit to users. That is, providing gaming establishment credit systems information about one or more financial accounts, such as bank accounts, a user has and the current balances of such accounts aids the gaming establishment credit system in offering the user a line of credit, thereby reducing the likelihood that a line of credit is extended to an otherwise unqualified user whom poses a relatively high risk of not paying back the funds activated from the line of credit. Accordingly, as seen in the example of FIG. 3A, a plurality of different components of the system of the present disclosure (i.e., a mobile device application being executed by a player's mobile device, a casino credit system, an external funding system and a bank) interact with each other, including communicating data (including, but not limited to, line of credit application data, bank account data, and line of credit offer data) and validation tokens, to open a line of credit with the casino credit system after the system analyses bank account information provided by the bank to determine the creditworthiness of the user.

In certain embodiments, in determining, based on the obtained financial information, one or more attributes of a line of credit to offer to a user, the system accounts for both assets and liabilities in determining the terms to offer the user under a proposed line of credit. For example, the system employs a designated ratio, such as 10%, applied to the user's determined assets minus determined liabilities (i.e., the user's net worth based on the provided financial information) to determine one or more aspects of a line of credit offered to the user. In certain such embodiments, the system employs a universal designated ratio for different users each having a different net worth. In other such embodiments, the system employs different designated ratios for different users each having a different net worth. For example, if the system determines, based on the provided financial information, that a first user has net worth of less than $5000, the system employs a designated ratio of 0% of assets minus liabilities and thus determines that no gaming establishment credit will be offered to the user. In this example, if the system determines, based on the provided financial information, that a second user has net worth of more than $5000, but less than $10,000, the system employs a designated ratio of 10% of assets minus liabilities in determining an amount of gaming establishment credit to offer the user. In this example, if the system determines, based on the provided financial information, that a third user has net worth of more than $10,000, but less than $50,000, the system employs a designated ratio of 20% of assets minus liabilities in determining an amount of gaming establishment credit to offer the user.

In certain embodiments, in addition to or alternative from employing a user's net worth (as determined based on the provided financial information) in determining one or more attributes of the applied for line of credit, to further reduce any credit risk in issuing any lines of credit, the system employs one or more validation or security checks on the provided financial information in determining one or more attributes of the applied for line of credit. In one such embodiment, the gaming establishment credit system inspects the historical transactions that have been obtained for one or more associated financial accounts to determine if any transactions indicate any risky activity on part of the user. For example, in determining one or more attributes of the applied for line of credit, the gaming establishment credit system accounts for the presence or absence of any overdraft charges, the presence or absence of any late payment fees charged or paid, the presence or absence of any bounced check transactions and/or any information related to any failed transactions that may have occurred (e.g., a failed automated clearing house ("ACH") transaction. It should be appreciated that such validation or security checks are performed prior to and/or after the user's creditworthiness has been determined based on the current outstanding account balances as provided. It should be further appreciated that the system leverages the information obtained via these validation or security checks to reduce or eliminate the amount of credit to offer to the user. For example, if the gaming establishment credit system determines the presence of any risky activities, such as the presence of one or more overdraft charges associated with the financial account linked to the gaming establishment fund management system, the gaming establishment credit system determines to deny the applied for line of credit (e.g., the gaming establishment credit system employs a designated ratio of 0% of assets minus liabilities and thus determines that no gaming establishment credit will be offered to the user).

In certain embodiments, the system additionally or alternatively analyses data from other data sources in determining one or more attributes of the applied for line of credit. For example, the gaming establishment credit system operates with a gaming establishment credit reporting/credit risk systems in determining one or more attributes of the applied for line of credit. In another example, the gaming establishment credit system accounts for historical information pertaining to the user, such as the user's historic information regarding paying off outstanding lines of credit, in determining one or more attributes of the applied for line of credit. It should be appreciated that the system leverages the information obtained from these data sources to modify the amount of credit to offer to the user. For example, if the gaming establishment credit system determines that the user has a history of successfully paying off past lines of credit from the gaming establishment, the gaming establishment credit system determines to increase the amount of the applied for line of credit (e.g., the gaming establishment credit system employs a designated ratio of 110% of assets minus liabilities and thus increases the amount of gaming establishment credit to be offered to the user).

In certain embodiments, the determination of one or more attributes of the applied for line of credit, such as the determination of whether to approve the applied for line of credit and/or the determination of an amount of credit to offer the user is additionally based on one or more attributes or characteristics of the user, such as a player ranking status of the user in a gaming establishment player tracking system. In certain embodiments, the determination of one or more attributes of the applied for line of credit, such as the determination of whether to approve the applied for line of credit and/or the determination of an amount of credit to offer the user is additionally based on any outstanding lines of credits (for any pending transfers) for the user. In certain embodiments, the determination of one or more attributes of the applied for line of credit, such as the determination of whether to approve the applied for line of credit and/or the determination of an amount of credit to offer the user is additionally based on an amount of the requested funds by the user (or an amount of requested funds for multiple users).

In certain embodiments, the system additionally or alternatively monitors activity in the linked external accounts to determine whether any modification of an issued line of credit is warranted to limit risk to the gaming establishment credit system. In one such embodiment, the gaming establishment credit system triggers additional balance requests to the user's linked accounts over the period when the line of credit is available to the user and takes action if the balances in the user's linked accounts change drastically or otherwise threaten the user's ability to pay back the issued line of credit. In another such embodiment, the gaming establishment credit system periodically requests additional transaction history for the user's linked accounts and takes action if any designated high risk transactions (e.g., overdraft fees, late payment fees) are detected that may threaten the user's ability to pay back the issued line of credit.

In certain embodiments, if the gaming establishment credit system determines that one or more designated changes have occurred in the balances of the user's linked accounts and/or one or more designated high risk transactions are detected, then the gaming establishment credit system prevents the user from further activation of funds in the issued line of credit. For example, upon receiving financial information from a player's linked bank account indicating that the balance of the player's linked bank account has been reduced by a certain percentage and/or below a minimum amount, then the gaming establishment credit system prevents the player from further activation of funds in the issued line of credit.

In certain other embodiments, if the gaming establishment credit system determines that one or more designated changes have occurred in the balances of the user's linked accounts and/or one or more designated high risk transactions are detected, the gaming establishment credit system places a block on the user's access to one or more gaming establishment fund management system accounts, such as the user's cashless wagering account, thereby prohibiting the user from performing any further transactions with the funds they have in such gaming establishment fund management system accounts. For example, upon detecting that a player has bounced multiple checks in their checking account after the approval of the line of credit, the gaming establishment credit system prevents the player from accessing the funds in their cashless wagering account until the activated amount of the issued line of credit is paid back. In another example, upon detecting that the funds in a player's checking account are otherwise put on hold by the player's bank for suspicious activities, the gaming establishment credit system automatically initiates a paying back of the activated amount of the issued line of credit with the funds in the player's cashless wagering account.

In various embodiments, in addition to utilizing financial information associated with a financial account maintained for a user to determine one or more attributes of an applied for line of credit, the system secures the applied for line of credit with a scheduled transfer of funds from one or more financial accounts maintained for the user. That is, unlike the systems of certain embodiments which utilize provided financial information to make one or more informed decisions in issuing the user an unsecured line of credit (i.e., a line of credit in the form of unsecured debit not backed by any pending transaction or collateral), the systems of these embodiment not only utilize provided financial information to make one or more informed decisions regarding issuing a line of credit, but additionally employs a scheduled transfer of funds in association with the issued line of credit thereby securing the line of credit against any potential defaults or non-payment events. In such embodiments, the scheduled transfer of funds operates to cover the applied for line of credit (plus any applicable fees, such as any late fees, any interest payment fees, any daily or periodic fees accrued, and/or any penalties) and reduce risks inherent with offering debt to gaming establishment patrons. In other words, the line of credit of these embodiments is backed by the transfer (scheduled to occur when the line of credit becomes due) and thus represents a relatively more secure transaction by the gaming establishment than other unsecured lines of credit. Accordingly, by first obtaining financial information from a financial account maintained for a user and then requiring that an applied for line of credit be paired with a scheduled transfer of an amount of funds from this financial account, the system of the present disclosure reduces instances of unpaid for lines of credit by not only making informed decisions regarding amounts of funds in one or more financial accounts maintained for a user prior to extending any credit to that user, but also by securing the amount of funds with a scheduled transfer to pay off part or all of an activated line of credit.

Figure 2C:
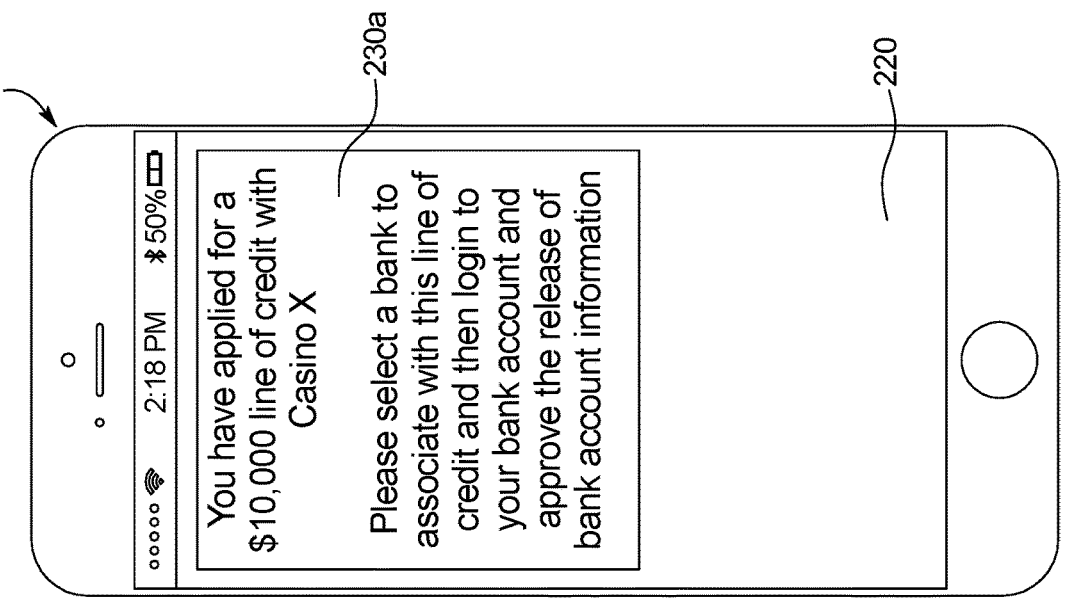

In certain embodiments, in recognition that existing forms of opening secured lines of credit (via a user writing a check to a gaming establishment to secure the line of credit with the understanding that the gaming establishment will only cash the check if the user does not pay off the line of credit by the time the amount of funds owed on the line of credit is due to be paid back) are not readily accessible due to the lack of use of checks, the system of these embodiments secure a line of credit with an electronically scheduled transfer of funds to the gaming establishment credit system to pay off the balance due on a line of credit issued to the user. In these embodiments, after, as described above, (i) the user requests a line of credit, and associates one or more of their gaming establishment fund management system accounts with one or more funding institutions, and (ii) the gaming establishment credit system inspects the associated accounts and determines an amount of credit to offer to the user, the gaming establishment credit system will then require the user to schedule an electronic transfer of funds from one or more associated bank accounts to the gaming establishment credit system to pay off the offered line of credit when the line of credit is due (e.g., seven days from approval of the line of credit). For example, as seen in FIG. 2C, following the gaming establishment credit system reviewing financial information associated with a linked bank account and otherwise determining that a player is creditworthy for a secured line of credit, a mobile device application 220 of a mobile device 210 displays a message 230c to the player that prior to approving the player's application for a $10,000 line of credit, the player needs to schedule a transfer from the linked bank account to be completed when the line of credit is due.

Figure 3B:
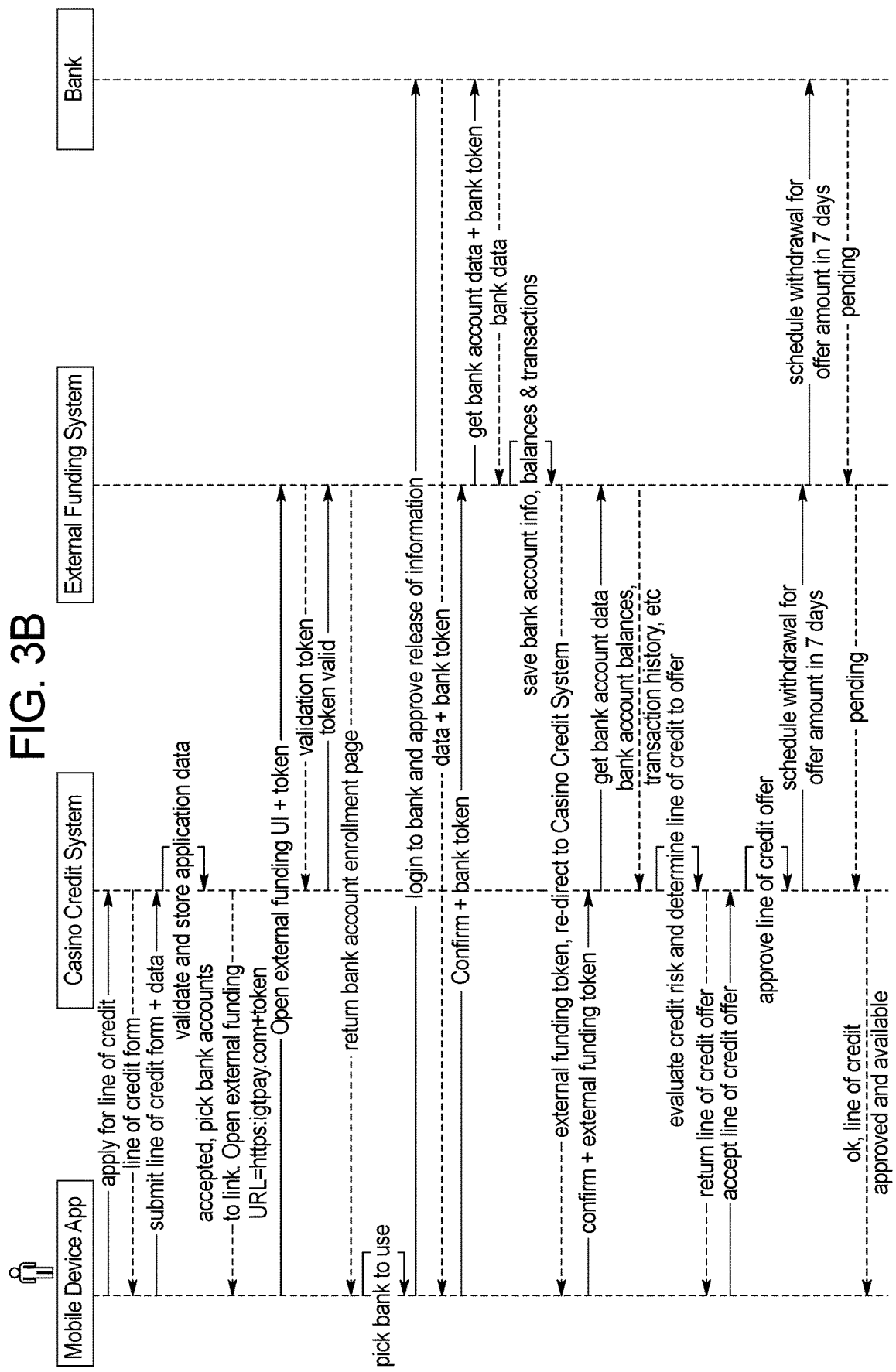

Following the user authorizing the scheduling of the transfer to secure the line of credit, the gaming establishment credit system operates with the external funding system (or other component of the gaming establishment fund management system) to schedule a transfer, such as an ACH transfer, a wire transfer or a debit card transfer, from the user's bank account (or set of bank accounts) to a gaming establishment bank account (or set of bank accounts) when the user's line of credit is due. Accordingly, as seen in the example of FIG. 3B, a plurality of different components of the system of the present disclosure (i.e., a mobile device application being executed by a player's mobile device, a casino credit system, an external funding system and a bank) interact with each other, including communicating data (including, but not limited to, line of credit application data, bank account data, and line of credit offer data) and validation tokens, to open a secured line of credit with the casino credit system after the system analyses bank account information provided by the bank to determine the creditworthiness of the user and in association with a scheduled transfer of funds to secure the amount of the line of credit.

In certain embodiments, while the user schedules a transfer of funds at a future date (e.g., when a line of credit would be due) when applying for the line of credit, when that future date arrives, one or more components of the gaming establishment fund management system may modify or cancel the previously scheduled transfer, such as cancelling the previously scheduled transfer or altering one or more aspects (e.g., amount, funding source) of the previously scheduled transfer. For example, if a player pays off the activated amount of funds from a line of credit before such funds are due, the gaming establishment credit system cancels the transfer previously scheduled by the player when they were offered the line of credit. In another example, if the player has only partially paid off the activated amount of funds from a line of credit by the time the line of credit is due, the gaming establishment credit system adjusts the previously scheduled transfer to reflect the outstanding amount of funds due on the line of credit (plus any applicable fees, such as late fees, extra interest, interest accrued, any daily or periodic fees accrued, and/or penalties). In another example, if a player has an amount of funds in an associated gaming establishment account, such as the player's cashless wagering account, to cover the amount of funds due on a line of credit, the gaming establishment credit system cancels (automatically or upon the player's request) the previously scheduled transfer and requests a transfer of funds from the associated gaming establishment account, such as the player's cashless wagering account, to the gaming establishment credit system to cover the amount of funds due on the line of credit. In certain of these embodiments, since one or more components of the gaming establishment fund management system may modify or cancel a previously scheduled transfer based on the current state of the line of credit, when the due date for an outstanding amount of funds owed on a line of credit is approaching, one or more components of the gaming establishment fund management system, such as the gaming establishment credit system notifies the player to pay off their outstanding line of credit liability (plus any applicable fees, such as any late fees, any interest payment fees, any daily or periodic fees accrued, and/or any penalties), wherein such notification takes any suitable form, such as one or more of an email, SMS message, and/or a notification with the mobile device application.

It should be appreciated that in certain embodiments, the modification and/or cancellation of a scheduled transfer of funds depends on the funding source/funding instrument initially set up by the user when applying for the line of credit. In such embodiments, if a transfer of funds transaction is executed immediately by a funding source, the funding source does support scheduling of future transfers of funds and/or the application programming interfaces employed to trigger a transfer of the selected funding instrument do not permit changes to the transaction before the transaction is committed (e.g., no cancellation of a transaction is permitted if a user pays part or all of the amount of funds activated from a line of credit off before being due), the system accounts for such circumstances when initially scheduling the transfer of funds or otherwise noting a potential scheduling of a transfer of funds. For example, if the funding instrument used when applying for a line of credit was a credit card or debit card, then the external funding system schedules the transfer internally and does not communicate the transfer request to the bank (or associated payment gateway) until the transaction needs to be executed.

Accessing Funds from an Issued Line of Credit and Transferring Accessed Funds to/from a Gaming Device In various embodiments, following the approval of a line of credit based on financial information obtained from one or more linked external accounts, the system enables a user, such as an identified player at an EGM, to make one or more inputs to cause a deposit an amount of funds associated with an issued line of credit into a gaming establishment account. The system further enables the user to make one or more inputs to initiate a transfer of funds from the gaming establishment account to a credit balance of a gaming device, such as an EGM, wherein upon being cashed out, such funds return to the gaming establishment account (and are not automatically used to settle part or all of the amount owed on the line of credit).

In certain embodiments, if a user wants to access the funds associated with a line of credit or marker at a gaming device, such an EGM, then following the user establishing the line of credit or marker with a gaming establishment credit system as described above, the user pairs or links their mobile device with the gaming device, wherein this pairing or linkage between the mobile device and the gaming device occurs via one or more applications being run or executed on the mobile device.

Following the pairing between the mobile device and the gaming device (or a component of the gaming device, such as a slot machine interface board ("SMIB") or other component of a gaming establishment management system supported by the gaming device), the system enables the user to utilize a mobile device to view information about one or more issued lines of credit (e.g., an available amount of funds associated with the issued line of credit and/or an amount of funds associated with the issued line of credit previously accessed) as well as the balance of zero, one or more gaming establishment accounts. In addition to enabling the user to view, via the mobile device application of the paired mobile device, information about one or more issued lines of credit, the system enables the user to activate all or part of the available amount of funds associated with the issued line of credit. That is, the system enables the user to access the issued line of credit from the mobile device application wherein the accessed amount of funds are transferred to a gaming establishment account associated with the user, such as the user's cashless wagering account and then transferred to a credit balance of the gaming device. In these embodiments, interfacing with the mobile device application (or alternatively the gaming device or a component of the gaming device), the system enables the player to make one or more inputs regarding the requested access to the line of credit, such as, but not limited to, one or more inputs to indicate an amount of funds to be accessed from the line of credit, one or more inputs to approve the indicated amount of funds to be accessed from the line of credit, and/or one or more inputs to confirm the accessing of the line of credit.

It should be appreciated that certain jurisdictional regulations and/or gaming establishment policies require the user to approve their transaction to access the funds on their issued line of credit. In one such embodiment, the user acknowledges the approval of accessing the issued line of credit by entering a personal identification number ("PIN") via the mobile device application, providing a signature and/or presenting a biometric identifier to the mobile device. In another embodiment, the user acknowledges the approval of accessing the issued line of credit by entering a PIN, providing a signature and/or presenting a biometric identifier to the gaming device or a peripheral device associated with the gaming device, such as a display device or input device associated with a SMIB in communication with a EGM.

In these embodiments, following receipt of the user inputted data associated with the determined amount of funds to be accessed from the issued line of credit and a confirmation from the user that they approve of the transaction and agree to any terms associated with the transaction, the mobile device application (and/or the gaming device or a component of the gaming device, such as the SMIB) communicates one or more messages to the gaming establishment credit system to log the user into the gaming establishment credit system (if necessary) and request an activation of the amount of funds to be accessed from the issued line of credit of the user. Upon receiving the messages from the mobile device application (and/or the gaming device or the component of the gaming device, such as the SMIB) and verifying the request, the gaming establishment credit system proceeds with operating with the gaming establishment fund management system or a component of the gaming establishment fund management system, such as a gaming establishment cashless wagering system, to log the user into a gaming establishment account associated with the user (if necessary) and potentially transfer the amount of funds to be accessed from the issued line of credit of the user to the gaming establishment account associated with the user, such as to a gaming establishment cashless wagering account associated with the user.

In certain embodiments, to complete a transfer of an amount of funds associated with a line of credit to a gaming establishment account, the gaming establishment credit system determines whether to authorize the activation of the determined amount of funds from the issued line of credit. In these embodiments, if the gaming establishment credit system determines not to authorize the activation of the determined amount of funds from the issued line of credit (e.g., the gaming establishment credit system determines that the requested amount exceeds the maximum amount available under the issued line of credit), the gaming establishment credit system communicates a denial to the mobile device application (and/or the gaming device or a component of the gaming device). In certain embodiments, following the denial, one or more display devices associated with the mobile device (and/or the gaming device or a component of the gaming device) display a denial of line of credit activation to the user.

On the other hand, if the gaming establishment credit system determines to authorize the activation of the determined amount of funds from the issued line of credit, the gaming establishment credit system updates the amount available of the issued line of credit and communicates an authorization of the requested amount of funds to the gaming establishment fund management system. Upon receiving the authorization, the gaming establishment fund management system updates a balance of a gaming establishment account by the requested amount of funds activated from the line of credit. Additionally, in certain embodiments, upon receiving the authorization, the gaming establishment fund management system updates an outstanding line of credit balance to reflect the amount of funds activated from the line of credit. As such, upon an amount of funds activated from a line of credit being accessed by a user (and, in certain instances, the gaming establishment credit system exposing the gaming establishment fund management system to information about the amount owed by the user to repay the outstanding amount of the line of credit), the amount of funds from the line of credit is not only added to any funds residing in the destination gaming establishment account, such as a cashless wagering account, but the amount of funds from the line of credit is separately added to an outstanding line of credit balance (which is maintained by the gaming establishment fund management system and/or the gaming establishment credit system).

In certain embodiments, in association with the transfer of an amount of funds associated with activated line of credit, the system communicates a transfer of funds confirmation, wherein one or more display devices associated with the mobile device (and/or the gaming device or a component of the gaming device) display a confirmation of the transfer of the amount of funds from the line of credit to the gaming establishment account.

In certain embodiments, following the completion of the transfer of an amount of funds associated with the line of credit to the gaming establishment account, such as a cashless wagering account associated with a user, the system enables the user to utilize a mobile device application to facilitate a transfer of an amount of funds from the gaming establishment account to a gaming device, such as an EGM. In certain embodiments, the mobile device application enables the user to input an amount of funds to be transferred to the gaming device, wherein the amount of funds may be part of or all of the amount accessed from the line of credit.

In certain embodiments, the mobile device application enables the user to select an amount of funds to be transferred from a listing of available amounts of funds to be transferred to the gaming device. In different embodiments, the listing of available amounts to be transferred is previously selected by the user, selected by a gaming establishment or selected by a third-party. In certain embodiments, the mobile device application enables the user, a gaming establishment and/or a third-party to modify the listing of available amount of funds. In another embodiment, the mobile device application determines the listing of available amount of funds based on one or more characteristics associated with the user, such as the user's prior amounts transferred, the user's wagering history, and/or the user's status. In another embodiment, the mobile device application determines the listing of available amount of funds based on one or more characteristics associated with the EGM, such as based on the denomination, game type, minimum bet and/or maximum available wager amount of the EGM.

In certain embodiments, following the determination of an amount of funds to be transferred from the gaming establishment account, such as the cashless wagering account, to the gaming device, the mobile device application prompts the user to cause the mobile device to engage the gaming device or a component of the gaming device, such as prompting the user to tap the mobile device to a player tracking card reader or other designated location(s) of the gaming device. After such engagement (or after the determination of an amount of funds to be transferred if no mobile device to gaming device engagement is required), the mobile device application communicates, via a wireless communication protocol (including, but not limited to: Bluetooth™ Bluetooth™ Low Energy ("BLE"), one or more cellular communication standards (e.g., 3G, 4G, 5G, LTE), one or more Wi-Fi compatible standards, and one or more short range communication protocols (e.g., a near field communication ("NFC") protocol), data associated with the determined amount of funds to be transferred from the gaming establishment account to the gaming device. For example, wherein the transfer of funds is from a cashless wagering account, the EGM (or a component of the EGM, such as a SMIB and/or the mobile device application) proceeds with operating with a cashless wagering system to log the player into a cashless wagering account associated with the player (if necessary) and request the determined amount of funds to be transferred from the cashless wagering account to the EGM.

Following the mobile device application interacting with the gaming device to facilitate the gaming device requesting the determined amount of funds, the gaming establishment fund management system (or a component of the gaming establishment fund management system, such as the cashless wagering system), determines whether to authorize the transfer of the determined amount of funds. If the component of the gaming establishment fund management system determines not to authorize the determined amount of funds, the component of the gaming establishment fund management system communicates a denial to the gaming device and/or the mobile device application, wherein the gaming device and/or mobile device application display a denial of funds transfer to the user.

On the other hand, if the component of the gaming establishment fund management system determines to authorize the determined amount of funds, the component of the gaming establishment fund management system updates the gaming establishment account associated with the user and communicates an authorization to the gaming device. For example, when funds are being transferred from a cashless wagering account to a EGM, the cashless wagering system reduces a balance of the cashless wagering account by the reduced amount of funds. The EGM proceeds with updating a credit balance of the EGM to account for the determined amount of funds. In certain embodiments, the EGM further proceeds with communicating a transfer of funds confirmation to the mobile device, wherein the mobile device application displays a confirmation of the transfer of the amount of funds and/or the updated credit balance of the EGM. Such a transferred amount of funds is then available for wagering by the player at the EGM.

It should be appreciated that while described as utilizing a mobile device running a mobile device application to access funds associated with different gaming establishment accounts, apply for one or more lines of credit in association with financial information obtained from a linked external account and/or to access funds associated with one or more lines of credit issued to the user, in various embodiments, the system utilizes any suitable interface, such as an interface of the gaming device, an interface of a remote host controlled service window displayed by a gaming device, and/or an interface of a component of a gaming establishment patron management system, such as a player tracking unit, to enable the user at the gaming device to access the funds associated with such gaming establishment accounts, apply for one or more lines of credit in association with financial information obtained from a linked external account and/or to access funds associated with one or more lines of credit issued to the user.

In certain embodiments, following the use of zero, part or all of the transferred amount of funds at an EGM and upon receiving a "cash out" input from the player, part or all of the credit balance of the EGM is transferred to the gaming establishment account, such as the cashless wagering account independent of any attempt to repay the amount of funds outstanding on any activated lines of credit. In these embodiments, unlike prior systems which required that any amount cashed out from an EGM is automatically applied to repay the amount of funds outstanding on any activated lines of credit, the system does not mandate that any amount cashed out from an EGM is automatically applied to repay the amount of funds outstanding on any activated lines of credit. Rather, the system continues to maintain the outstanding line of credit balance prior to and after an amount of funds are cashed out from an EGM and enables such cashed out funds to flow to a gaming establishment account, such as a cashless wagering account, thereby reducing user tension by not having to continually activate the line of credit at each EGM played. In other words, to facilitate ease of line of credit fund movement from one EGM to another EGM, the gaming establishment fund management system tracks such line of credit funds as a separate balance eliminating the need to repeatedly reactivate a line of credit after each cash out event (thus saving the user time).

In certain embodiments, following one or more inputs to cash out a credit balance of an EGM to a gaming establishment account (which may be made in association with the EGM, in association with a component of the EGM or in association with a mobile device application of a mobile device paired to the EGM), the EGM (or a component of the EGM, such as the SMIB) operates with the gaming establishment fund management system (or a component of the gaming establishment fund management system, such as the cashless wagering system), to transfer the amount of funds of the credit balance of the EGM to the gaming establishment account, such as the cashless wagering account associated with the player.

In certain other embodiments, the system determines to facilitate the transfer of funds from the EGM to the gaming establishment account, such as the cashless wagering account, independent of any input by the player. In one such embodiment, if the system determines that no activity has occurred for a designated amount of time, as a precautionary measure, the system transfers the credit balance of the EGM from the EGM to the gaming establishment account used to transfer funds to the EGM. In another embodiment, if the system determines that another player is attempting to log onto the EGM, as a precautionary measure, the system transfers the credit balance of the EGM from the EGM to the gaming establishment account used to transfer funds to the EGM. Such transfers of the credit balance to the gaming establishment account is associated with a termination of the player's current gaming session.

In these embodiments, after a determination to transfer the credit balance of the EGM from the EGM to a gaming establishment, the EGM proceeds with operating with the gaming establishment fund management system (or a component of the gaming establishment fund management system, such as the cashless wagering system) to log the player into a gaming establishment account, such as a cashless wagering account associated with the player (or confirm that the player remains logged into the gaming establishment account) and request the determined amount of funds to be transferred from the EGM to the gaming establishment account. Following such a request, the EGM proceeds with updating a credit balance of the EGM to account for the determined amount of funds transferred from the EGM to the gaming establishment account. The gaming establishment system (or the component of the gaming establishment fund management system, such as the cashless wagering system) additionally updates the gaming establishment account associated with the player (e.g., the cashless wagering system adds the determined amount of funds to the cashless wagering account) and communicates a confirmation to the EGM. The EGM further proceeds with displaying a transfer of funds confirmation (and additionally or alternatively communicating a transfer of funds confirmation to the mobile device), wherein the EGM (and/or the mobile device application) displays a confirmation of the transfer of the amount of funds and/or the updated credit balance of the EGM. Such a transferred amount of funds is available in the gaming establishment account to be transferred to another gaming device (such as another EGM or a gaming table component) or another gaming establishment account, such as to a gaming establishment retail account.

Repaying of Activated Line of Credit

In various embodiments wherein a line of credit is applied for based on financial information obtained from a linked external account and independent of any scheduled attempted payoff of the applied for line of credit, in addition to funding a gaming establishment account with an amount of funds associated with an issued line of credit and enabling such funds to be cashed out from a credit balance of a gaming device to a gaming establishment account, the system monitors for an occurrence of a line of credit repayment event. In these embodiments, upon a line of credit repayment event, the system attempts to repay part or all of the outstanding line of credit balance.

Specifically, in instances when a scheduled transfer of funds to pay off a line of credit at a due date is not part of the application process to open the line of credit, upon an occurrence of a line of credit repayment event, the gaming establishment fund management system (or a component of the gaming establishment fund management system, such as the cashless wagering system) communicates one or more messages to the gaming establishment credit system to log the user into the gaming establishment credit system (if necessary) and attempts to pay back an amount of funds accessed from the issued line of credit of the user. Upon receiving the messages and verifying the request, the gaming establishment credit system proceeds with operating with the gaming establishment fund management system (or a component of the gaming establishment fund management system, such as the cashless wagering system), to log the user into a gaming establishment account associated with the user (if necessary) and potentially transfer the amount of funds accessed from the issued line of credit of the user from the gaming establishment account associated with the user to the gaming establishment credit system to pay off part or all of the outstanding line of credit balance.

In certain embodiments, to complete a transfer of an amount of funds associated with a line of credit from a gaming establishment account, the gaming establishment fund management system determines whether to authorize the transfer of the determined amount of funds to pay off part or all of the issued line of credit. In these embodiments, if the gaming establishment fund management system determines not to authorize the transfer of the determined amount of funds to pay off the issued line of credit (e.g., the gaming establishment account balance lacks the funds to pay off part or all of the issue line of credit), the gaming establishment fund management system communicates a denial to the gaming establishment credit system. In certain embodiments, following the denial, one or more display devices display a denial of line of credit payoff to the user.

On the other hand, if the gaming establishment fund management system determines to authorize the transfer of the determined amount of funds to pay off part or all the issued line of credit (e.g., the gaming establishment account balance has adequate funds to pay off part or all of the issue line of credit), the gaming establishment fund management system updates the outstanding line of credit balance (to reflect a paying off of part or all of the issued line of credit), updates the balance of the gaming establishment account (to reflect the transfer of the funds away from the gaming establishment account) and communicates an authorization of the transfer to the gaming establishment credit system. Upon receiving the authorization, the gaming establishment credit system updates the outstanding line of credit.

In certain embodiments, a line of credit repayment event occurs responsive to one or more inputs made by the user indicating a repayment of part or all of an outstanding line of credit. In these embodiments, the user may make such inputs via any suitable interface at any suitable device such as via a kiosk, via a mobile device application, and/or via a web interface, wherein such inputs trigger the line of credit repayment event and the gaming establishment fund management system operating with the gaming establishment credit system to repay part or all of one or more outstanding lines of credit. In certain embodiments, a line of credit repayment event occurs responsive to one or more inputs made by an operator of the system indicating a request for a repayment of part or all of an outstanding line of credit. In these embodiments, the operator may make such inputs via any suitable interface at any suitable device such as via a device at a gaming establishment cage, via an operator work station and/or via a web interface, wherein such inputs trigger the line of credit repayment event and the gaming establishment fund management system operating with the gaming establishment credit system to repay part or all of one or more outstanding lines of credit.

In certain embodiments, a line of credit repayment event occurs responsive to one or more events occurring in association with the gaming establishment fund management system. In these embodiments, the gaming establishment fund management system (or a component of the gaming establishment fund management system, such as the cashless wagering system) determines that a line of credit repayment event occurs at a designated interval, such as every hour, every 24 hours, every week, when the gaming establishment's "end of day" occurs or a date/time when repayment of the line of credit is required, wherein such events trigger the line of credit repayment event and the gaming establishment fund management system operating with the gaming establishment credit system to repay part or all of one or more outstanding lines of credit. In certain embodiments, a line of credit repayment event occurs responsive to one or more notifications being received by the gaming establishment fund management system. In these embodiments, the gaming establishment fund management system (or a component of the gaming establishment fund management system, such as the cashless wagering system) determines that a line of credit repayment event occurs upon receiving a notification associated with a user having an outstanding line of credit, such as upon a player with a positive outstanding line of credit balance checking out of their hotel room or upon a player with a positive outstanding line of credit balance ending their trip to the gaming establishment, wherein such notifications trigger the gaming establishment fund management system operating with the gaming establishment credit system to repay part or all of one or more outstanding lines of credit.

In certain embodiments, a line of credit repayment event occurs responsive to one or more events occurring in association with the gaming establishment credit system. In these embodiments, the gaming establishment credit system determines that a line of credit repayment event occurs at a designated interval, such as every hour, every 24 hours, every week, when the gaming establishment's "end of day" occurs or a date/time when repayment of the line of credit is required, wherein such events trigger the line of credit repayment event and the gaming establishment credit system attempting to operate with the gaming establishment fund management system to repay part or all of one or more outstanding lines of credit. In certain embodiments, a line of credit repayment event occurs responsive to one or more notifications being received by the gaming establishment credit system. In these embodiments, the gaming establishment credit system determines that a line of credit repayment event occurs upon the gaming establishment credit system receiving a notification associated with a user having an outstanding line of credit, such as upon a player with a positive outstanding line of credit balance checking out of their hotel room or upon a player with a positive outstanding line of credit balance ending their trip to the gaming establishment, wherein such notifications trigger the gaming establishment credit system attempting to operate with the gaming establishment fund management system to repay part or all of one or more outstanding lines of credit.

In certain embodiments, a line of credit repayment event occurs responsive to a deposit of an amount of funds to a gaming establishment account, such as a cashless wagering account. In certain such embodiments, the system determines if a line of credit repayment event occurs upon a deposit of an amount of funds to a gaming establishment account based on the device utilized to make such a deposit. That is, the system can determine what type of device is performing the deposit and whether the deposit with that type of device warrants an occurrence of a line of credit repayment event. For example, if an amount of funds is deposited to a gaming establishment account from an EGM, the system may assume that this deposit action is the result of a cash-out and this can then trigger (possibly with the player's prior authorization) an attempt to repay some or all of the outstanding balance of the line of credit from the amount transferred from the EGM to the gaming establishment account. It should be appreciated that since, as described below, an amount may be deposited into a gaming establishment as a player directed non-cash out action via an interface of an EGM, in certain embodiments, the system determines if a line of credit repayment event occurs upon a deposit of an amount of funds to a gaming establishment account based on the device utilized to make such a deposit and one or more actions undertaken at that device.

Additional Sourcing of Funds Transferred to Gaming Establishment Fund Management Account In various embodiments, in addition to funding a gaming establishment account with an amount of funds associated with an issued line of credit, the system enables the gaming establishment account to be funded from one or more additional sources.

In certain embodiments, the gaming establishment fund management account is associated with one or more external accounts, such as one or more credit card accounts, one or more debit card accounts and/or one or more third-party maintained accounts (e.g., one or more PayPal® accounts or Venmo® accounts). In certain embodiments, the gaming establishment fund management account is associated with a gaming establishment or a group of gaming establishments, wherein the user establishes a gaming establishment fund management account by a deposit of funds (such as at a kiosk) to be subsequently utilized in association with the mobile device application. In other embodiments, the gaming establishment fund management account is funded via a mobile device electronic fund transfer, such using Apple Pay™ or Android Pay™. It should be appreciated that in different embodiments, the system utilizes a mobile device running a mobile device application, a kiosk, an EGM, a gaming table component, a remote host controlled service window displayed and/or a gaming establishment interface to facilitate the transfer of funds from a third-party account.

In certain embodiments, the system enables funds to be deposited in a gaming establishment fund management account via a gaming device, such as an EGM. In certain embodiments, the system enables a user that has an amount of cash to utilize a gaming device to convert the cash to an amount deposited into a gaming establishment fund management account (which may be subsequently transferred utilizing a mobile device application). In other embodiments, the system enables funds to be deposited in a gaming establishment fund management account via a gaming device that accepts printed ticket vouchers. In these embodiments, the system enables a user that has one or more printed ticket vouchers to utilize a gaming device to convert the printed ticket voucher to an amount deposited into a gaming establishment fund management account (which may be subsequently transferred utilizing a mobile device application).

In certain embodiments, the system enables funds to be deposited in a gaming establishment fund management account via a gaming establishment interface, such as a gaming establishment cage or desk. In certain embodiments, the system enables a user that has an amount of cash to utilize a gaming establishment interface, such as a gaming establishment cage or desk to convert the cash to an amount deposited into a gaming establishment fund management account (which may be subsequently transferred utilizing a mobile device application). In other embodiments, the system enables funds to be deposited in a gaming establishment fund management account via a gaming establishment interface that accepts printed ticket vouchers. In these embodiments, the system enables a user that has one or more printed ticket vouchers to utilize a gaming establishment interface to convert the printed ticket voucher to an amount deposited into a gaming establishment fund management account (which may be subsequently transferred utilizing a mobile device application).

In certain embodiments, the system enables funds to be deposited in a gaming establishment fund management account via a kiosk that accepts money. In certain embodiments, the system enables a user that has an amount of cash to utilize a kiosk to convert the cash to an amount deposited into a gaming establishment fund management account (which may be subsequently transferred to a gaming device utilizing a mobile device application). In other embodiments, the system enables funds to be deposited in a gaming establishment fund management account via a kiosk that accepts printed ticket vouchers. In certain embodiments, the system enables a user that has one or more printed ticket vouchers to utilize a kiosk to convert the printed ticket voucher to an amount deposited into a gaming establishment fund management account (which may be subsequently transferred to a gaming device utilizing a mobile device application).

In certain embodiments, the gaming establishment fund management account is associated with funds associated with one or more virtual ticket vouchers. In certain embodiments, the system enables a user associated with an amount of virtual ticket vouchers to utilize a gaming device (e.g., an EGM, a component of an EGM) a mobile device running a mobile device application, a kiosk and/or a gaming establishment interface to convert the virtual ticket vouchers to an amount deposited into a gaming establishment fund management account.

In certain embodiments, the system enables a user to fund the gaming establishment fund management account independent of the mobile device and independent of the mobile device application. In certain other embodiments, the system enables a user to utilize a mobile device running a mobile device application to fund the gaming establishment fund management account. More specifically and utilizing the example of a kiosk, in one embodiment, to utilize a mobile device and a kiosk to facilitate the funding of a gaming establishment fund management account, the user wirelessly pairs or otherwise connects a mobile device with a kiosk. In one example embodiment, the user moves the mobile device into the range of a wireless receiver of the kiosk. The kiosk and the launched or activated mobile device application of the mobile device negotiate a secure, authenticated connection with the proper functionality, versions and security settings. It should be appreciated that the kiosk wirelessly connects with the mobile device running the mobile device application in the same or similar fashion to how a mobile device is paired or connected with a gaming device of the present disclosure.

After connecting the mobile device to the kiosk, the kiosk prompts the user to deposit an amount of funds into the kiosk. In one such embodiment, the kiosk prompts the user to insert one or more bills into a bill acceptor of the kiosk. In another such embodiment, the kiosk additionally or alternatively prompts the user to deposit a physical ticket voucher (associated with an amount of funds) into the kiosk. In another such embodiment, the kiosk additionally or alternatively prompts the user to deposit a card associated with an external account, such as a credit card or debit card into the kiosk. In another such embodiment, the kiosk additionally or alternatively prompts the user to enter information associated with an external account, such as a credit card account, a PayPal® account, a Venmo® account, or a debit card account into the kiosk. In another such embodiment, the kiosk additionally or alternatively prompts the user to deposit an amount of funds into the kiosk using a mobile device electronic fund transfer, such using Apple Pay™ or Android Pay™.

In one embodiment, after a first amount of funds is accepted, such as after a first bill or unit of currency is accepted, by the kiosk, the kiosk and/or the mobile device application enable the user to transfer the deposited amount of funds (e.g., a "Load Phone Now" button) or continue to deposit additional amounts of funds with the kiosk. In another embodiment, for each amount of funds accepted by the kiosk, such as for each bill or unit of currency accepted by the kiosk, a virtual ticket voucher is created and deposited in the gaming establishment fund management account.

In certain embodiments, upon receiving an amount of funds from the user and the user indicating to transfer the deposited amount of funds in association with the mobile device application, the kiosk communicates with one or more servers to transfer an amount of money to a gaming establishment fund management account (to be drawn upon from the mobile device application of the present disclosure). In another such embodiment, upon receiving an amount of funds from the user and the user indicating to transfer the deposited amount of funds in association with an account or balance associated with the mobile device application, the kiosk communicates with one or more servers, such as a virtual ticket voucher server, to create a virtual ticket voucher associated with the amount of received currency. The system of the present disclosure transfers the created virtual ticket voucher to the gaming establishment fund management account.

Linking Mobile Device to Gaming Device

In certain embodiments, as indicated above, prior to enabling a user, such as a player, to take any action related to the system (such as using a mobile device to facilitate the access of funds associated with an issued line of credit and causing a transfer of such funds from a cashless wagering account to a gaming device), a pairing or linkage occurs between the mobile device and the gaming device, such as the EGM. The pairing or linkage between the mobile device and the gaming device occurs via one or more applications being run or executed on the mobile device.

In certain embodiments, after a user has opened an application on a mobile device, logged into the application (if required) and selected an action to be performed (such as accessing a line of credit from the mobile device), the system determines if the mobile device application is associated with an active authorization token previously created by the system. In these embodiments, an authorization token is a time-based token which expires after a designated period of time and which is associated with an additional level of user authentication beyond a user's application username and application password.

If the system determines that the application is not associated with an active authorization token previously created by the system, the mobile device application prompts the user to provide identifying information, such as a personal identification number or biometric identifier. The mobile device application stores the provided identifying information as mobile device encrypted data. Following the user providing identifying information, the mobile device application prompts the user to cause the mobile device to engage the gaming device (e.g., the EGM, a component of the EGM), such as prompting the user to tap the mobile device to a designated portion of the EGM. It should be appreciated that any reference herein to a user tapping the mobile device to a designated portion of the gaming device may or may not include the user pressing a fingerprint scanner (if the mobile device is equipped with such a fingerprint scanner) while concurrently engaging the gaming device. In other embodiments, the mobile device application verifies the identifying information of the user by communicating with a verification/authentication server over one or more wireless communication protocols, such as WiFi protocol, a cellular communication protocol, to obtain the active authorization token.

In certain embodiments, following the user causing the mobile device to engage the gaming device (e.g., the user taps the mobile device to a player tracking card reader or other designated location(s) of an EGM), the mobile device application communicates, via a wireless communication protocol, the provided identifying information and the requested action to be performed to the gaming device. For example, upon the user tapping the mobile device to a player tracking card reader or other designated location(s) of the EGM (or otherwise moving the mobile device to within a designated distance of the player tracking card reader or other designated locations(s) of the EGM), the mobile device application sends the identifying information and the requested action to a component of a gaming establishment management system located inside the EGM, such as a NexGen® player tracking component of an IGT Advantage® system. NexGen® and IGT Advantage® are trademarks of IGT, the Applicant of the present application.

Following the communication of the identifying information and the requested action to the gaming device, the system determines if the identifying information is valid. For example, a designated system component configured to operate with a player tracking system determines whether the identifying information is valid.

If the system determines that the identifying information is invalid, the system communicates an invalid identifying information response to the mobile device. For example, an identifying information status message is communicated to the mobile device which reports whether the identifying information is valid or invalid. The mobile device application then displays one or more messages regarding the invalid identifying information and prompts the user to provide identifying information, such as a personal identification number or biometric identifier. In certain such embodiments, if the mobile device receives a communication that the identifying information is invalid (or alternatively in association with the initial creation of a token) and if the mobile device includes a fingerprint scanner, the mobile device application prompts the user to press the fingerprint scanner while engaging the gaming device, such as tapping the mobile device to a designated portion of an EGM.

On the other hand, if the system determines that the identifying information is valid, the system creates an authorization token. The system associates the authorization token with a timestamp of when the authorization token will expire. In certain embodiments, a cashless system includes a key distribution center which generates a session key to encrypt all cashless messages. The session key is rotated periodically at a configurable rate from 1 hour to 24 hours. In these embodiments, the system utilizes this session key to sign the token data and create a token. As such, the token time-to-live will be less than or equal to the session key rotation period. In other embodiments, such authorization tokens are managed utilizing software (and not a key distribution center).

In certain embodiments, the authorization token expires after a designated period of time as an additional level of security in the transfer of fund data to/from the EGM component which is facilitated the mobile device. Such a designated amount of time which an authorization token remains valid enables the user to move from one gaming device (e.g., one gaming table associated with one gaming table component) to another gaming device (e.g., another gaming table associated with another gaming table component) and, transfer funds to/from each gaming device and a gaming establishment account, without having to reprovide such identifying information each time the user switches gaming devices. That is, the mobile device application of the present disclosure is configured to communicate with one or more gaming devices (without having to reauthenticate itself repeatedly) during the designated amount of time which the authorization token remains valid.

Following the creation of an authorization token, the system communicates the created authorization token to the mobile device, such as via one or more messages including the created authorization token, for storage by the mobile device application and proceeds with executing one or more of the requested actions and communicating a requested action response to the mobile device. For example, upon the creation of the authorization token, the component of a gaming establishment management system located inside the gaming device, such as a NexGen® player tracking component of an IGT Advantage ° system, communicates the created authorization token to the mobile device and proceeds with executing the requested action.

On the other hand, following a determination that the mobile device application is associated with a previously created and stored authentication token, the mobile device application prompts the user to cause the mobile device to engage the gaming device, such as prompting the user to tap the mobile device to a designated portion of the EGM.

Following the user causing the mobile device to engage the gaming device (e.g., the user taps the mobile device to a player tracking card reader or other designated location(s) of the EGM), the mobile device application communicates, via a wireless communication protocol, the previously stored authorization token and the requested action to be performed to the gaming device. For example, upon the user tapping the mobile device to a player tracking card reader or other designated location(s) of an EGM, the mobile device application sends the stored authorization token and the requested action to a component of a gaming establishment management system located inside the EGM, such as a NexGen® player tracking component of an IGT Advantage® system.

Following the communication of the stored authorization token and the requested action to the gaming device, the system determines if the communicated authorization token is still valid. For example, a system component configured to operate with a player tracking system determines whether the authorization token is valid (i.e., active and non-expired).

If the system determines that the communication authorization token is invalid, the system communicates an invalid authorization token response to the mobile device. The mobile device application then displays one or more messages regarding the invalid authorization token and prompts the user to provide identifying information, such as a personal identification number or biometric identifier, to obtain another authentication token.

On the other hand, if the system determines that the stored authorization token is valid, the system proceeds with executing the requested action. For example, upon the determination that the communicated authorization token is valid, the component of a gaming establishment management system located inside the EGM proceeds with executing the requested action and communicates a requested action response to the mobile device.

In certain embodiments, the system enables a user to interact with the gaming device via the mobile device, without having to continually reengage the gaming device with the mobile device for each requested action. In these embodiments, after initially establishing a secure connection with the gaming device, subsequent interactions between the mobile device application and the gaming device occur without any subsequent physical interaction between the mobile device and the gaming device. That is, to avoid having the user retrieve the mobile device and repeat the physical operation of engaging the gaming device with the mobile device, certain embodiments enable the user to execute one or more functions without repeating the above-described physical operation of engaging the gaming device with the mobile device. In certain such embodiments, the mobile device application utilizes one or more display devices of the gaming device to display to the user information and/or user selectable prompts which are otherwise displayable via the display device of the mobile device.

In certain other embodiments, for each interaction or requested action between the gaming device and the mobile device, the system requires the user to reengage the gaming device with the mobile device to reestablish or confirm the pairing between the gaming device and the mobile device. In certain other embodiments, for each interaction between the gaming device and the mobile device that occur a designated amount of time after the last engagement of the gaming device with the mobile device, the system requires the user to reengage the gaming device with the mobile device to reestablish or confirm the pairing between the gaming device and the mobile device.

Utilizing Paired Mobile Device Application

In various embodiments, after pairing the mobile device with the EGM or the component of the EGM, the mobile device application communicates one or more requested actions to be performed. Such requested actions generally pertain to an action associated with a user account, or an action associated with an initiation of a transfer of funds. It should be appreciated that while certain data or information pertaining to one or more of the requested actions are communicated from an EGM or a component of the EGM to a mobile device, such data or information may additionally or alternatively be communicated: (i) from one or more servers to a mobile device via one or more wireless communication protocols, or (ii) from an EGM to one or more servers via one or more wireless communication protocols and then from one or more servers to a mobile device via one or more wireless communication protocols.

User Accounts

In certain embodiments, the action to be performed includes enabling the user to log into a casino loyalty account, such as a player tracking account, via a wireless communication protocol, utilizing the mobile device application.

In certain embodiments, the action to be performed includes enabling the user to log out of a casino loyalty account, such as a player tracking account, via a wireless communication protocol, utilizing the mobile device application. In different embodiments, upon receiving one or more "cash out" inputs from the user, if the system determines that no activity has occurred for a designated amount of time, or if the system determines that another user is attempting to log in, the mobile device application facilitates a logging out of the casino loyalty account. Such logging out of the casino loyalty account is associated with a termination of the user's current gaming session. Specifically, the gaming device (e.g., an EGM or a component of the EGM) proceeds with operating with a user loyalty system (i.e., a player tracking system) to log the user out of the user loyalty account to complete the player tracking session at the gaming device In certain embodiments, the action to be performed additionally or alternatively includes enabling the user to log into a gaming establishment account, such as a cashless wagering account, via a wireless communication protocol, utilizing the mobile device application. In certain such embodiments, following the user selecting an image associated with an electronic casino loyalty account card stored via a digital wallet application or following the mobile device application retrieving data associated with a gaming establishment account stored via a digital wallet application, the mobile device application prompts the user to cause the mobile device to engage the gaming device, such as prompting the user to tap the mobile device to a card reader or other designated location(s) of the gaming device. After such engagement (or after the launching of the mobile device application if no mobile device to gaming device engagement is required), the mobile device application communicates, via a wireless communication protocol, user gaming establishment account data stored by the mobile device to the gaming device. The gaming device proceeds with operating with the gaming establishment fund management system to log the user into a gaming establishment account associated with the user. In one embodiment, the system determines a balance of the gaming establishment account (in terms of both cashable credits and non-cashable credits) associated with the user and causes the gaming device to communicate, via one or more wireless communication protocols, the determined gaming establishment account balance to the mobile device.

Fund Transfers

In certain embodiments, as described above, the action to be performed additionally or alternatively includes enabling the user to facilitate the transfer of funds from a gaming establishment account to an EGM utilizing the mobile device application.

In certain embodiments, the action to be performed additionally or alternatively includes enabling the user to transfer funds from a virtual ticket voucher to the gaming device utilizing the mobile device application. In certain embodiments, following the launching of the mobile device application, such as following the user selecting an image associated with an electronic casino loyalty account card stored via a digital wallet application, the mobile device application determines an amount of funds to be transferred to the gaming device via the redemption of a virtual ticket voucher. In these embodiments, the mobile device application displays to the user images representing any virtual ticket vouchers associated with the mobile device. The mobile device application enables the user to select one or more images representing one or more virtual ticket vouchers associated with the mobile device. In these embodiments, similar to as described above with respect to the transfer of funds from a gaming establishment account to a gaming device via a mobile device application, following the determination of which virtual ticket vouchers are to be transferred from the mobile device application to the gaming device, the mobile device application prompts the user to cause the mobile device to engage the gaming device. The mobile device application then communicates, via a wireless communication protocol, data associated with the selected virtual ticket voucher to be transferred. The gaming device then communicates with one or more servers, such as a virtual ticket voucher server, to request the selected virtual ticket voucher (and more specifically the amount of funds associated with the selected virtual ticket voucher) be transferred from to the gaming device. The server then determines whether to authorize the transfer of the selected virtual ticket voucher. If the transfer of the selected virtual ticket voucher is authorized: (i) the server updates a database of virtual ticket vouchers to reflect the redemption of the selected virtual ticket voucher, (ii) the gaming device proceeds with updating a balance of the gaming device (attributable to the user and redeemable for gaming chips) to account for the amount of funds associated with the selected virtual ticket voucher, (iii) a transfer of funds confirmation is communicated to and displayed by the mobile device, and (iv) the amount of funds associated with the selected virtual ticket voucher are available for wagering by the user.

In certain embodiments, the action to be performed additionally or alternatively includes transferring non-cashable credits to the gaming device utilizing the mobile device application. In various embodiments, the system includes transferring non-cashable credits to a gaming device in association with a fund transfer to a cashless wagering account from a gaming establishment retail account which is part of a gaming establishment retail system.

Securing Transactions Between Mobile Device and Gaming Device

While the facilitation of the transfer of funds to and from a gaming device via a mobile device has many advantages described herein, certain security concerns arise when transferring fund data wirelessly between a gaming device and a mobile device (or between a gaming device and the mobile device via one or more servers). For example, a malicious person may attempt to intercept such a wireless communication and steal the funds being transferred. Such a malicious person may devise electronics, such as an antenna or other electronics placed on or near the gaming device to insert their mobile device between a "cash out" input and the mobile device engaging the gaming device.

More specifically, when facilitating the transfer of deposited funds and/or an amount of winnings from the gaming device to a gaming establishment account via the mobile device application, a user initiates an engagement of the gaming device with the mobile device, such as tapping the mobile device to a player tracking card reader or other designated location(s) of the gaming device. However, before the engagement of the gaming device with the user's mobile device is complete, an intruder utilizes such devised electronics to beat the user to the completion of the engagement. In this example, when the user subsequently actuates a "cash out" button on the gaming device, the gaming device proceeds with transferring the amount of the credit balance of the mobile device of the intruder. Such a concern is also present when a user attempts to wirelessly transfer funds to a gaming device via a mobile device wherein the intruder device intercepts such a transfer and reroutes the funds to the mobile device of the intruder.

In view of these security concerns, certain embodiments of the present disclosure utilize a time window, such as ten seconds, in association with one or more requested actions. In one such embodiment, after receiving an initiation of an engagement of the gaming device with the mobile device, the gaming device assigns or otherwise associates a time window with such an engagement. If one mobile device is attempted to be paired with the gaming device within the associated time window before an action is requested, the gaming device determines that only one mobile device is communicating with the gaming device and the gaming device proceeds with executing the requested action, such as a requested fund transfer of the present disclosure. On the other hand, if more than one mobile device is attempted to be paired with the gaming device within the associated time window before an action is requested, the gaming device determines that an intruder device may be present. In such a situation, the gaming device cancels the requested action and/or prompts the user to reengage the gaming device with the mobile device.

In another such embodiment, after receiving a requested action from the mobile device, the gaming device assigns or otherwise associates a time window with such a requested action. Following the requested action, if one mobile device is attempted to be paired with the gaming device within the associated time window, the gaming device determines that only one mobile device is communicating with the gaming device and the gaming device proceeds with executing the requested action, such as a requested fund transfer of the present disclosure. On the other hand, following the requested action, if more than one mobile device is attempted to be paired with the gaming device within the associated time window, the gaming device determines that an intruder device may be present. In such a situation, the gaming device cancels the requested action and/or prompts the user to reengage the gaming device with the mobile device.

It should be appreciated that in addition to thwarting an isolated attempt by an intruder to intercept a wireless fund transfer, the system is configured to identify if a device is involved in multiple attempted engagements with a gaming device over a designated threshold or time window. In this embodiment, such a device may be prohibited from being involved in further wireless fund transfers. For example, if multiple engagements are detected involving a single device within a twenty-four hour period, then that mobile device could be banned from participating in any future engagements. Alternatively, that device could be prevented from participating in engagements for a designated period of time, such as a cooling-off period.

It should be appreciated that the mobile device facilitated fund data transfers of the present disclosure may occur in addition to or as an alternative from cash-based fund transfers and/or ticket voucher-based fund transfers. In one such embodiment, an amount of funds transferred to an EGM is funded via any of a mobile device facilitated fund transfer, a cash-based fund transfer or a ticket voucher-based fund transfer. In another embodiment, an amount of funds transferred from an EGM is cashed out via any of a mobile device facilitated fund transfer, a cash-based fund transfer or a ticket voucher-based fund transfer. In another embodiment, an amount of funds transferred to an EGM is funded via a mobile device facilitated fund transfer or a cash-based fund transfer (but is not funded via any ticket voucher-based fund transfer). In another embodiment, an amount of funds transferred from an EGM is cashed out via a mobile device facilitated fund transfer or a cash-based fund transfer (but is not cashed out via any ticket voucher-based fund transfer). In another embodiment, an amount of funds transferred to an EGM is funded via a mobile device facilitated fund transfer or a ticket voucher-based fund transfer (but is not funded via any cash-based fund transfer). In another embodiment, an amount of funds transferred from an EGM is cashed out via a mobile device facilitated fund transfer or a ticket voucher-based fund transfer (but is not cashed out via any cash-based fund transfer). In another embodiment, an amount of funds transferred to an EGM is funded via a mobile device facilitated fund transfer (but is not funded via a cash-based fund transfer nor a ticket voucher-based fund transfer). In another embodiment, an amount of funds transferred from an EGM is cashed out via a mobile device facilitated fund transfer (but is not cashed out via a cash-based fund transfer nor a ticket voucher-based fund transfer).

It should be further appreciated that any functionality or process of the present disclosure may be implemented via one or more servers, one or more EGMs, one or more components of an EGM, one or more gaming table components, one or more gaming establishment components (such as a component of a gaming establishment management system (e.g., a player tracking unit) supported by or otherwise located inside the gaming table component), or a mobile device application. For example, while certain data or information of the present disclosure is explained as being communicated from an EGM, a component of an EGM, a gaming table component or a gaming establishment component (such as a component of a gaming establishment management system (e.g., a player tracking unit) supported by or otherwise located inside the gaming table component) to a mobile device via one or more wireless communication protocols, such data or information may additionally or alternatively be communicated from one or more servers to a mobile device via one or more wireless communication protocols. Accordingly: (i) while certain functions, features or processes are described herein as being performed by an EGM, a component of an EGM, or a gaming table component, such functions, features or processes may alternatively be performed by one or more servers, or one or more mobile device applications, or one or more gaming establishment components (such as a component of a gaming establishment management system (e.g., a player tracking unit) supported by or otherwise located inside the gaming table component), (ii) while certain functions, features or processes are described herein as being performed by one or more mobile device applications, such functions, features or processes may alternatively be performed by one or more servers, one or more EGMs, one or more components of an EGM, one or more gaming table components, or one or more gaming establishment components (such as a component of a gaming establishment management system (e.g., a player tracking unit) supported by or otherwise located inside the gaming table component), (iii) while certain functions, features or processes are described herein as being performed by one or more servers, such functions, features or processes may alternatively be performed by one or more EGMs, one or more components of an EGM, one or more gaming table components, one or more mobile device applications, or one or more gaming establishment components (such as a component of a gaming establishment management system (e.g., a player tracking unit) supported by or otherwise located inside the gaming table component)), and (iv) while certain functions, features or processes are described herein as being performed by one or more gaming establishment components (such as a component of a gaming establishment management system (e.g., a player tracking unit) supported by or otherwise located inside the gaming table component), such functions, features or processes may alternatively be performed by one or more EGMs, one or more components of an EGM, one or more gaming table components, or one or more mobile device applications, or one or more servers.

EGM Components

In certain embodiments, the above-described embodiments of the present disclosure may be implemented in accordance with or in conjunction with an EGM.

Figure 4:
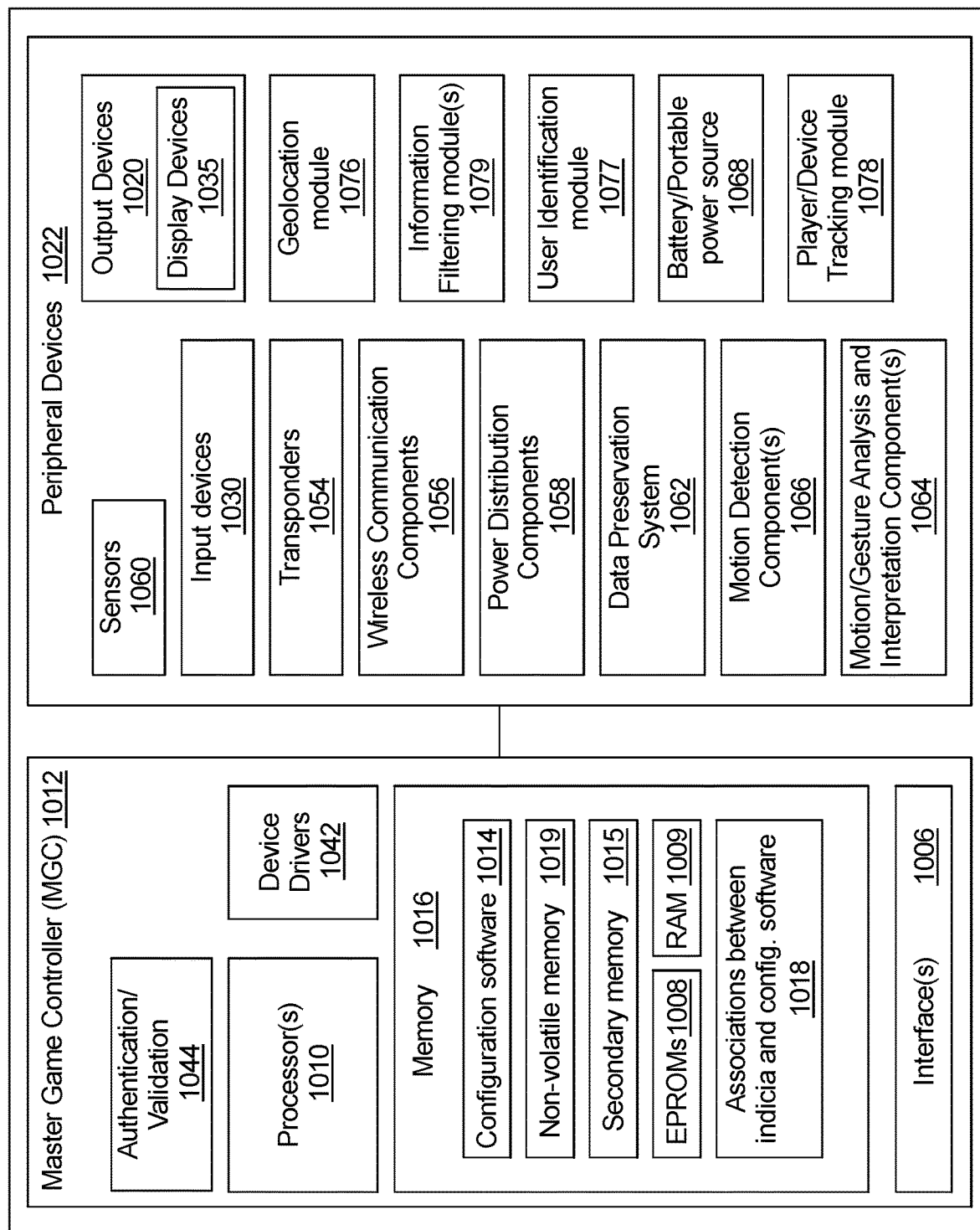
FIG. 4 is a schematic block diagram of one embodiment of an electronic configuration of an example electronic gaming machine.
Figure 5A:
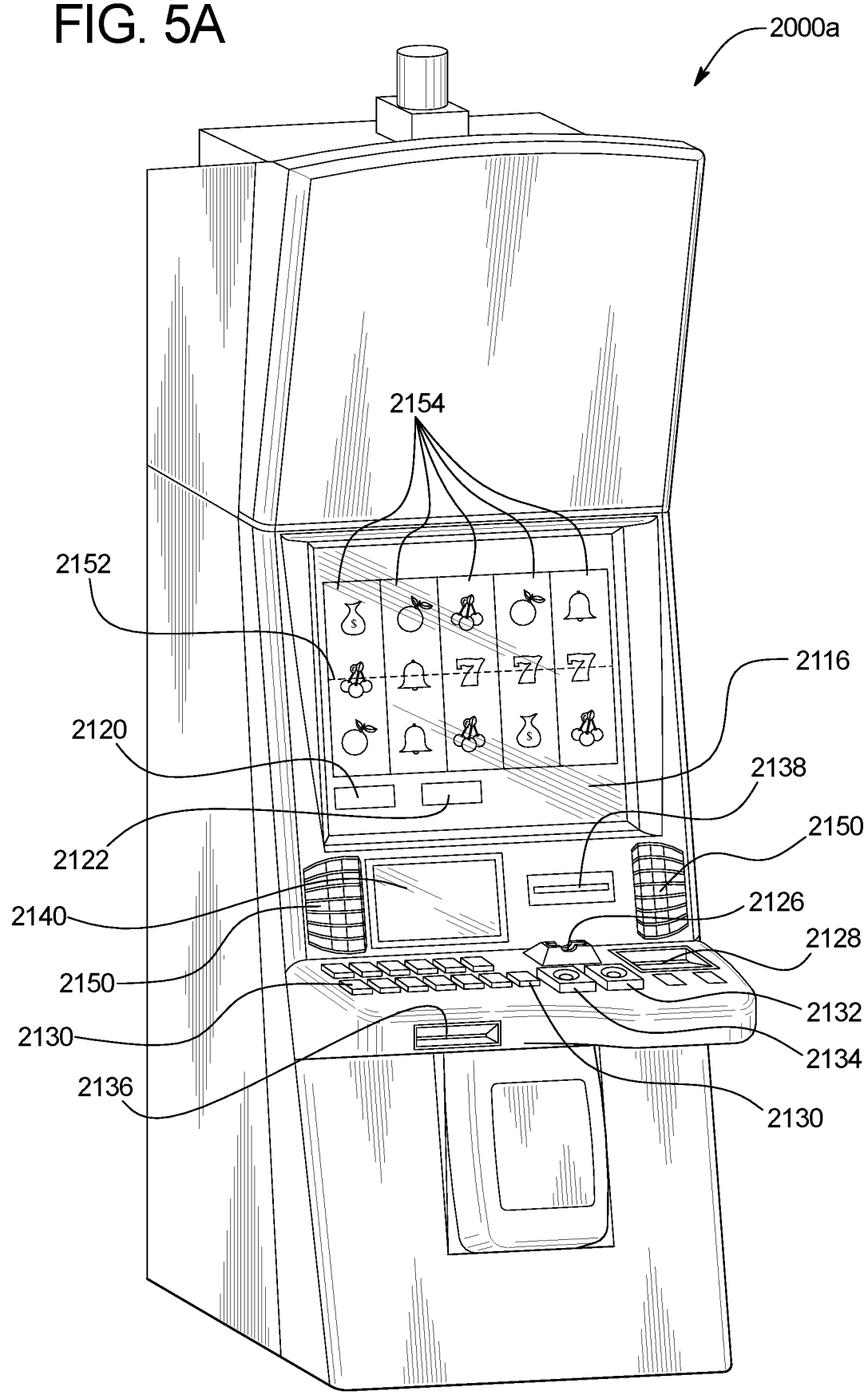
FIGS. 5A and 5B are perspective views of example alternative embodiments of an example electronic gaming machine.
Figure 5B:
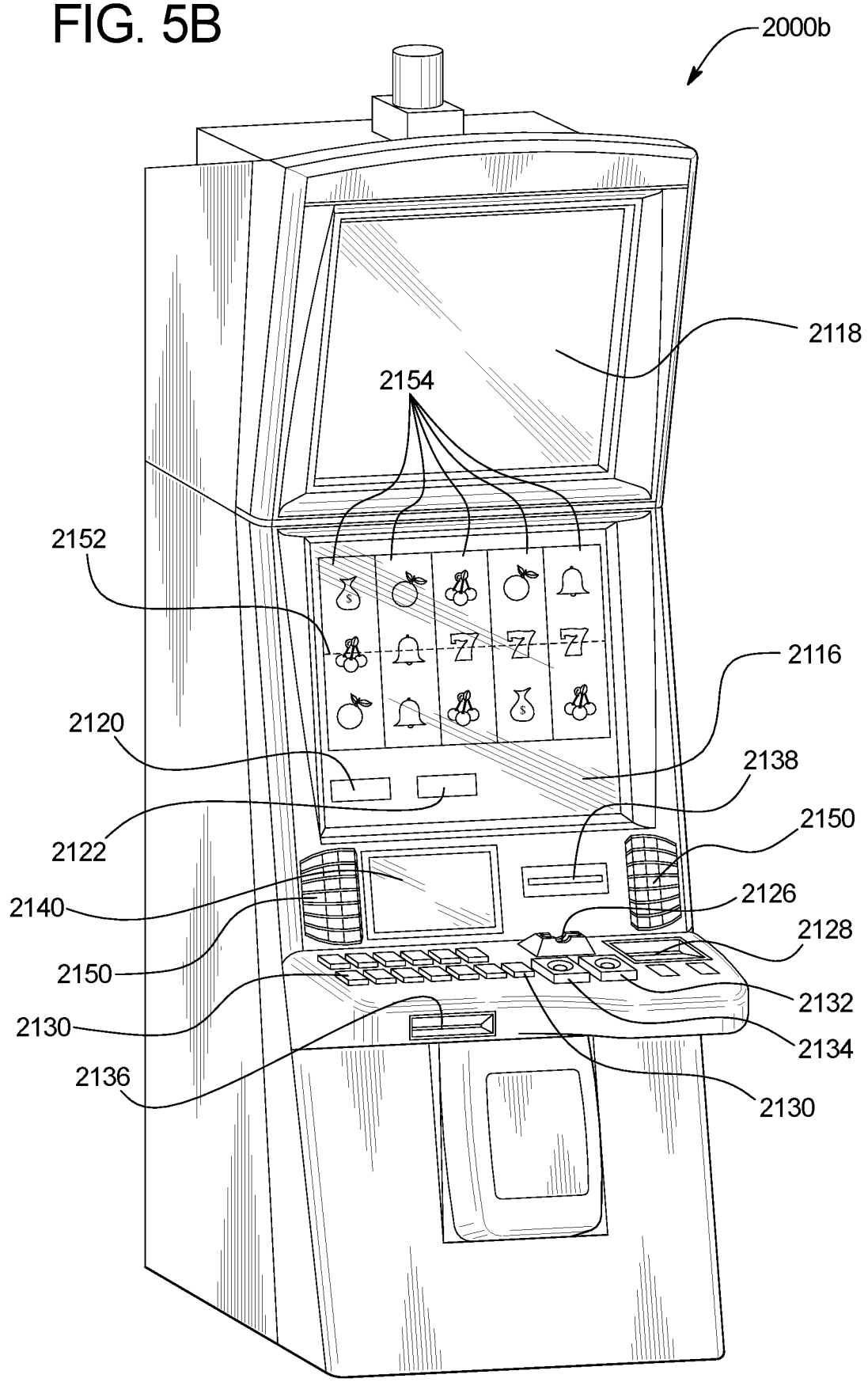

FIG. 4 is a block diagram of an example EGM 1000 and FIGS. 5A and 5B include two different example EGMs 2000a and 2000b. The EGMs 1000, 2000a, and 2000b are merely example EGMs, and different EGMs may be implemented using different combinations of the components shown in the EGMs 1000, 2000a, and 2000b.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000a illustrated in FIG. 5A includes a central display device 2116, a player tracking display 2140, a credit display 2120, and a bet display 2122. The example EGM 2000b illustrated in FIG. 5B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000a and 2000b illustrated in FIGS. 5A and 5B each include a ticket printer and dispenser 2136.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for nonmonetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000a and 2000b illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000a and 2000b illustrated in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000a and 2000b illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000a and 2000b illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000a and 2000b illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 1000 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all EGMs, and these example EGMs may not include one or more elements that are included in other EGMs. For example, certain EGMs include a coin acceptor while others do not.

Differentiating Certain Gaming Devices from General Purpose Computing Devices

It should be appreciated that certain of the gaming devices (e.g., EGMs and/or gaming table components) include certain components and/or are configured to operate in certain manners that differentiate these systems from general purpose computing devices (i.e., certain personal devices such as desktop computers and laptop computers).

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A gaming establishment credit system comprising:
a processor; and
a memory device that stores a plurality of instructions that, when executed by the processor responsive to a receipt of data associated with a request to establish a gaming establishment line of credit of a first amount of funds exclusively accessible in association with a gaming establishment and following a user separately logging into a financial institution computing device and authorizing, independent of the processor interfacing with the financial institution computing device, a release of financial information associated with a financial account of the user maintained by the financial institution, cause the processor to:
receive, from the financial institution computing device and via an independently operating external funding system, the released financial information associated with the financial account, wherein the financial account is maintained independent of the processor, the financial information is distinct from any data associated with any credit check of the user and the financial institution is distinct from any credit reporting agency,
determine, based on the received financial information and without receiving any data associated with any credit check of the user determined by any credit reporting agencies computing devices, a parameter of the gaming establishment line of credit, and
responsive to a determination of a first parameter of the gaming establishment line of credit:
enable an activation of a first gaming establishment marker for up to the first amount of funds, and
responsive to the activation of the first gaming establishment marker in association with an electronic gaming machine, cause a transfer of fund data associated with at least part of the first amount of funds to modify a credit balance of the electronic gaming machine independent of any receipt of any physical item associated with any monetary value to modify the credit balance of the electronic gaming machine.

2. The gaming establishment credit system of claim 1, wherein when executed by the processor responsive to a determination of a second, different parameter of the gaming establishment line of credit, the instructions cause the processor to enable an activation of a second gaming establishment marker for up to a second, different amount of funds.

3. The gaming establishment credit system of claim 1, wherein when executed by the processor responsive to a determination of a second, different parameter of the gaming establishment line of credit, the instructions cause the processor to deny an establishment of the gaming establishment line of credit.

4. The gaming establishment credit system of claim 1, wherein the received financial information comprises at least one of a balance of the financial account, a credit to the financial account, a debit of the financial account, a historical transaction of the financial account, and any designated high risk transactions of the financial account.

5. The gaming establishment credit system of claim 1, wherein when executed by the processor after the determination of the first parameter of the gaming establishment line of credit and responsive to a receipt, from the financial institution computing device and via the external funding system, of updated financial information associated with the financial account of the user, the instructions cause the processor to modify the first amount of funds in association with the gaming establishment line of credit.

6. The gaming establishment credit system of claim 5, wherein the modification of the first amount of funds comprises a reduction of the first amount of funds.

7. The gaming establishment credit system of claim 1, wherein when executed by the processor after the determination of the first parameter of the gaming establishment line of credit and responsive to a receipt, from the financial institution computing device and via the external funding system, of updated financial information associated with the financial account of the user, the instructions cause the processor to cancel the gaming establishment line of credit.

8. The gaming establishment credit system of claim 1, wherein the receipt of financial information associated with the financial account of the user occurs following a linkage of the financial account of the user with a cashless wagering account maintained for the user.

9. The gaming establishment credit system of claim 1, wherein the receipt of financial information associated with the financial account of the user occurs in association with the external funding system.

10. A gaming establishment credit system comprising:
a processor; and
a memory device that stores a plurality of instructions that, when executed by the processor responsive to a receipt of data associated with a request to establish a gaming establishment line of credit of a first amount of funds exclusively accessible in association with a gaming establishment and following a user separately logging into a financial institution computing device and authorizing, independent of the processor interfacing with the financial institution computing device, a release of financial information associated with a financial account of the user maintained by the financial institution, cause the processor to:
receive, from the financial institution computing device via an independently operating external funding system, the released financial information associated with the financial account, wherein the financial account is maintained independent of the processor, the financial information is distinct from any data associated with any credit check of the user and the financial institution is distinct from any credit reporting agency,
determine, based on the received financial information and without receiving any data associated with any credit check of the user determined by any credit reporting agencies computing devices, a parameter of the gaming establishment line of credit,
responsive to a determination of a first parameter of the gaming establishment line of credit and prior to any scheduling of any transfer of the first amount of funds from the financial account of the user to any cashless wagering account of the user, deny an establishment of the gaming establishment line of credit, and responsive to the determination of the first parameter of the gaming establishment line of credit, following a scheduling of a transfer of the first amount of funds from the financial account of the user to a cashless wagering account of the user and prior to completing the transfer of the first amount of funds from the financial account of the user to the cashless wagering account of the user:
  automatically activate a first gaming establishment marker for up to the first amount of funds-in association with the gaming, and
  cause a transfer of fund data associated with at least part of the first amount of funds to an electronic gaming machine identified as associated with the user to modify a credit balance of the electronic gaming machine independent of any receipt, by a payment device of the electronic gaming machine, of any physical item associated with any monetary value to modify the credit balance of the electronic gaming machine.

11. The gaming establishment credit system of claim 10, wherein when executed by the processor responsive to a determination of a second, different parameter of the gaming establishment line of credit, following a scheduling of a transfer of a second, different amount of funds from the financial account of the user to the cashless wagering account of the user and prior to completing the transfer of the second, different amount of funds from the financial account of the user to the cashless wagering account of the user, the instructions cause the processor to automatically activate a second gaming establishment marker for up to the second, different amount of funds, and cause a transfer of fund data associated with at least part of the second, different amount of funds to the electronic gaming machine.

12. The gaming establishment credit system of claim 10, wherein when executed by the processor responsive to a determination of a second, different parameter of the gaming establishment line of credit, the instructions cause the processor to deny the establishment of the gaming establishment line of credit.

13. A method of operating a gaming establishment credit system, the method comprising:
  responsive to a receipt of data associated with a request to establish a gaming establishment line of credit of a first amount of funds exclusively accessible in association with a gaming establishment and following a user separately logging into a financial institution computing device and authorizing, independent of a processor of the gaming establishment credit system interfacing with the financial institution computing device, a release of financial information associated with a financial account of the user maintained by the financial institution:
    receiving, from the financial institution computing device and via an independently operating external funding system, the released financial information associated with the financial account, wherein the financial account is maintained independent of the processor, the financial information is distinct from any data associated with any credit check of the user and the financial institution is distinct from any credit reporting agency,
    determining, by the processor of the gaming establishment credit system and based on the received financial information and without receiving any data associated with any credit check of the user determined by any credit reporting agencies computing devices, a parameter of the gaming establishment line of credit, and
    responsive to a determination of a first parameter of the gaming establishment line of credit:
      enabling, by the processor of the gaming establishment credit system, an activation of a first gaming establishment marker for up to the first amount of funds, and
      responsive to the activation of the first gaming establishment marker in association with an electronic gaming machine, causing a transfer of fund data associated with at least part of the first amount of funds to modify a credit balance of the electronic gaming machine independent of any receipt of any physical item associated with any monetary value to modify the credit balance of the electronic gaming machine.

14. The method of claim 13, further comprising, responsive to a determination of a second, different parameter of the gaming establishment line of credit, enabling, by the processor of the gaming establishment credit system, an activation of a second, different gaming establishment marker for up to a second, different amount of funds.

15. The method of claim 13, further comprising, responsive to a determination of a second, different parameter of the gaming establishment line of credit, denying, by the processor of the gaming establishment credit system, an establishment of the gaming establishment line of credit.

16. The method of claim 13, wherein the received financial information comprises at least one of a balance of the financial account, a credit to the financial account, a debit of the financial account, a historical transaction of the financial account, and any designated high risk transactions of the financial account.

17. The method of claim 13, further comprising, after the determination of the first parameter of the gaming establishment line of credit and responsive to a receipt, from the financial institution computing device and via the external funding system, of updated financial information associated with the financial account of the user, modifying, by the processor of the gaming establishment credit system, the first amount of funds in association with the gaming establishment line of credit.

18. The method of claim 17, wherein the modification of the first amount of funds comprises a reduction of the first amount of funds.

19. The method of claim 13, further comprising, after the determination of the first parameter of the gaming establishment line of credit and responsive to a receipt, from the financial institution computing device and via the external funding system, of updated financial information associated with the financial account of the user, cancelling, by the processor of the gaming establishment credit system, the gaming establishment line of credit.

20. The method of claim 13, wherein the receipt of financial information associated with the financial account of the user occurs following a linkage of the financial account of the user with a cashless wagering account maintained for the user.

* * * * *